United States Patent
Hwang et al.

(10) Patent No.: US 11,219,004 B2
(45) Date of Patent: *Jan. 4, 2022

(54) METHOD FOR RECEIVING DOWNLINK SIGNAL IN WIRELESS COMMUNICATION SYSTEM AND TERMINAL USING THE SAME

(71) Applicant: LG Electronics Inc., Seoul (KR)

(72) Inventors: Daesung Hwang, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

This patent is subject to a terminal disclaimer.

(21) Appl. No.: 16/561,978

(22) Filed: Sep. 5, 2019

(65) Prior Publication Data
US 2019/0394760 A1 Dec. 26, 2019

Related U.S. Application Data

(63) Continuation of application No. 16/210,816, filed on Dec. 5, 2018, now Pat. No. 10,448,388, which is a
(Continued)

(30) Foreign Application Priority Data

Jun. 26, 2018 (KR) .................... 10-2018-0073538

(51) Int. Cl.
*H04W 72/04* (2009.01)
*H04L 5/00* (2006.01)
*H04L 27/26* (2006.01)

(52) U.S. Cl.
CPC ............ *H04W 72/042* (2013.01); *H04L 5/00* (2013.01); *H04L 5/001* (2013.01); *H04L 5/0094* (2013.01); *H04L 27/2602* (2013.01)

(58) Field of Classification Search
None
See application file for complete search history.

(56) References Cited

U.S. PATENT DOCUMENTS 7,885,230 B2 * 2/2011 Seo ................. H04L 5/0039
370/329
8,831,116 B2 * 9/2014 Xiao ................. H04B 7/066
375/260
(Continued)

FOREIGN PATENT DOCUMENTS

KR 10-2013-0018075 2/2013
KR 10-2016-0103556 9/2016
(Continued)

OTHER PUBLICATIONS

India Office Action in India Appln No. 201817043746, dated Sep. 8, 2020, 5 pages.
(Continued)

*Primary Examiner* — Gregory B Sefcheck
(74) *Attorney, Agent, or Firm* — Fish & Richardson P.C.

(57) ABSTRACT

Provided are a method and an apparatus for receiving a downlink signal in a wireless communication system. The method includes receiving resource block assignment information including a bitmap and receiving the downlink signal through a resource block group (RBG) indicated by the bitmap in a bandwidth part. A total number of resource block groups (RBGs) in the bandwidth part is determined based on an index of a start resource block of the bandwidth part, a size of the bandwidth part, and a size of one resource block group.

12 Claims, 14 Drawing Sheets

Related U.S. Application Data continuation of application No. PCT/KR2018/007262, filed on Jun. 27, 2018.

(60) Provisional application No. 62/653,533, filed on Apr. 5, 2018, provisional application No. 62/616,412, filed on Jan. 11, 2018.

(56) References Cited

U.S. PATENT DOCUMENTS

| | | | |
|---|---|---|---|
| 9,137,821 | B2 | 9/2015 | Farajidana |
| 9,246,656 | B2 | 1/2016 | Kim |
| 9,473,279 | B2 | 10/2016 | Blankenship |
| 9,578,625 | B2 | 2/2017 | Seo |
| 9,602,264 | B2 | 3/2017 | Kim |
| 9,871,638 | B2 | 1/2018 | Kim |
| 9,894,654 | B2 | 2/2018 | Astely |
| 9,949,261 | B2 * | 4/2018 | Chen ............ H04L 5/0094 |
| 9,974,058 | B2 | 5/2018 | Maattanen |
| 10,021,685 | B2 * | 7/2018 | Chen ............ H04W 72/044 |
| 10,205,569 | B2 * | 2/2019 | Kim ............. H04W 72/042 |
| 10,219,265 | B2 * | 2/2019 | You ............. H04L 5/005 |
| 10,292,148 | B2 * | 5/2019 | Elbwart ......... H04W 16/14 |
| 10,708,764 | B2 * | 7/2020 | Hayashi ......... H04W 72/1289 |
| 2012/0014330 | A1 | 1/2012 | Damnjanovic et al. |
| 2013/0017835 | A1 * | 1/2013 | Takahashi ....... H04L 5/0092 455/450 |
| 2013/0176952 | A1 | 7/2013 | Shin et al. |
| 2014/0105155 | A1 | 4/2014 | Kim |
| 2015/0016370 | A1 | 1/2015 | Takeda |
| 2015/0131546 | A1 | 5/2015 | Seo |
| 2016/0088594 | A1 * | 3/2016 | Xiong ........... H04L 5/0094 370/329 |
| 2017/0347354 | A1 | 11/2017 | Yang et al. |
| 2018/0049169 | A1 | 2/2018 | Lin |
| 2018/0049203 | A1 | 2/2018 | Xue |
| 2018/0132211 | A1 | 5/2018 | Huang |
| 2018/0241499 | A1 | 8/2018 | Einhaus |
| 2018/0279289 | A1 | 9/2018 | Islam |
| 2019/0052432 | A1 | 2/2019 | Islam |
| 2020/0196281 | A1 * | 6/2020 | Bergman ........ H04W 72/042 |

FOREIGN PATENT DOCUMENTS

| | | |
|---|---|---|
| RU | 2468511 | 11/2012 |
| WO | WO2011084822 | 7/2011 |

OTHER PUBLICATIONS

Ericsson, "Summary of offline session on 7.3.3.1 (resource allocation)," R1-1721488, TSG-RAN WG1 #91, Reno, NV, US, Nov. 27-Dec. 1, 2017, 21 pages.

LG Electronics, "Discussion on resource allocation and TBS determination," R1-1719929, 3GPP TSG RAN WG1 Meeting 91, Reno, USA, Nov. 27-Dec. 1, 2017, 16 pages.

ZTE, Sanechips, "Considerations on resource allocation issues," R1-1719491, 3GPP TSG RAN WG1 Meeting 91, Reno, USA, Nov. 27-Dec. 1, 2017, 14 pages.

NTT Docomo, Inc., "Work plan for Rel-15 NR WI," R1-1718177, 3GPP TSG RAN WG1 Meeting #90bis, Prague, CZ, Oct. 9-13, 2017, 174 pages.

"3rd Generation Partnership Project; Technical Specification Group Radio Access Network; NR; Physical layer procedures for data (Release 15)," 3GPP TS 38.214, V15.0.0, (Dec. 2017), 46 pages.

G Electronics, "Discussion on resource allocation and TBS determination," 'R1-1719929', 3GPP TSG RAN WG1 Meeting 91, Reno, USA, Nov. 27-Dec. 1, 2017, 18 pages.

$3^{rd}$ Generation Partnership Project; Technical Specification Group Radio Access Network; NR; "Physical Layer Procedures for Data (Release 15)," 3GPP TS 38.214 V2.0.0, dated Dec. 2017, 71 pages.

Japanese Office Action in JP Appln. No. 2019-569819, dated Feb. 9, 2021, 4 pages (with English translation).

Extended European Search Report in European Application No. 18800028.5, dated Feb. 24, 2020, 8 pages.

LG Electronics, "Remaining issues on resource allocation," R1-1800379, 3GPP TSG RAN WG1 Meeting AH 1801, Vancouver, Canada, dated Jan. 22-26, 2018, 8 pages.

LGE, NEC, Alcatel Lucent, Motorola, Samsung, "Correction to the downlink resource allocation," R1-082928, 3GPP TSG-RAN1 Meeting #54, Jeju, Korea, dated Aug. 18-22, 2008, 3 pages.

RU Office Action in Russian Appln. No. 2019110837, dated Jun. 7, 2021, 15 pages (with English translation).

* cited by examiner

METHOD FOR RECEIVING DOWNLINK SIGNAL IN WIRELESS COMMUNICATION SYSTEM AND TERMINAL USING THE SAME

CROSS-REFERENCE TO RELATED APPLICATIONS

This application is a continuation of U.S. application Ser. No. 16/210,816, filed on Dec. 5, 2018 and issued as U.S. Pat. No. 10,448,388, which claims the benefit of International Application PCT/KR2018/007262, with an international filing date of Jun. 27, 2018, which claims the benefit of U.S. Provisional Patent Applications Nos. 62/616,412, filed on Jan. 11, 2018, 62/653,533, filed on Apr. 5, 2018, and Korean Patent Application No. 10-2018-0073538 filed in the Korean Intellectual Property Office on Jun. 26, 2018, the contents of which are hereby incorporated by reference herein in its entirety.

BACKGROUND OF THE INVENTION

Field of the Invention

The present disclosure relates to wireless communication and, more particularly, to a method for receiving a downlink signal by a terminal (or a user equipment (UE)) in a wireless communication system and a terminal using the method.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

In a future wireless communication system, a bandwidth part may be introduced. The bandwidth part may be used to allocate some bands to a terminal which has difficulty in supporting a broadband in a wireless communication system using the broadband. Resource allocated to the UE in this bandwidth part may be allocated in units of resource block groups (RBGs), and here, how the number of RBGs is to be determined in the bandwidth part may be a problem.

In addition, the BS may use interleaving in allocating resources to a UE. Interleaving may be mapping a virtual resource block, which is a logical resource block, to a physical resource block. The unit of interleaving may be a resource block bundle, and a relationship between boundaries of the resource block bundle and the physical resource block is required to be defined.

SUMMARY OF THE INVENTION

The present disclosure provides method for receiving a downlink signal by a terminal (or a user equipment (UE)) in a wireless communication system and a terminal using the method.

In one aspect, provided is a method for receiving a downlink signal in a wireless communication system. The method includes receiving resource block assignment information including a bitmap and receiving the downlink signal through a resource block group (RBG) indicated by the bitmap in a bandwidth part. A total number of resource block groups (RBGs) in the bandwidth part is determined based on an index of a start resource block of the bandwidth part, a size of the bandwidth part, and a size of one resource block group.

When the bandwidth part is i-th bandwidth part (i is 0 or a natural number), the total number ($N_{RBG}$) of the RBGs may be determined by the following equation, $$N_{RBG} = \lceil (N_{BWP,i}^{size} + (N_{BWP,i}^{start} \bmod P))/P \rceil$$

wherein $N^{start}_{BWP,i}$ denotes an index of a starting resource block of the i-th bandwidth part, $N^{size}_{BWP,i}$ denotes a size of i-th bandwidth part, and P denotes a size of one RBG.

A number of bits of the bitmap may be equal to the total number ($N_{RBG}$) of the RBGs.

The P may be selected according to a size of the bandwidth part from among candidate values previously set through a radio resource control (RRC) message.

Bits of the bitmap correspond to the RBGs of the bandwidth part, respectively, to indicate whether each RBG is allocated.

In another aspect, provided is a terminal. The terminal includes a transceiver transmitting and receiving a wireless signal and a processor coupled with the transceiver to operate. The processor receives resource block assignment information including a bitmap, and receives the downlink signal through a resource block group (RBG) indicated by the bitmap in a bandwidth part. A total number of resource block groups (RBGs) in the bandwidth part is determined based on an index of a start resource block of the bandwidth part, a size of the bandwidth part, and a size of one resource block group.

In a next generation wireless communication system such as NR, the present invention provides a method for determining the number of resource allocation units (e. g., RBG) and the size of the resource allocation field in a frequency domain can be determined. It is possible to efficiently perform resource allocation for the frequency domain without waste of the bits of the resource allocation field.

DESCRIPTION OF EXEMPLARY EMBODIMENTS

Figure 1:
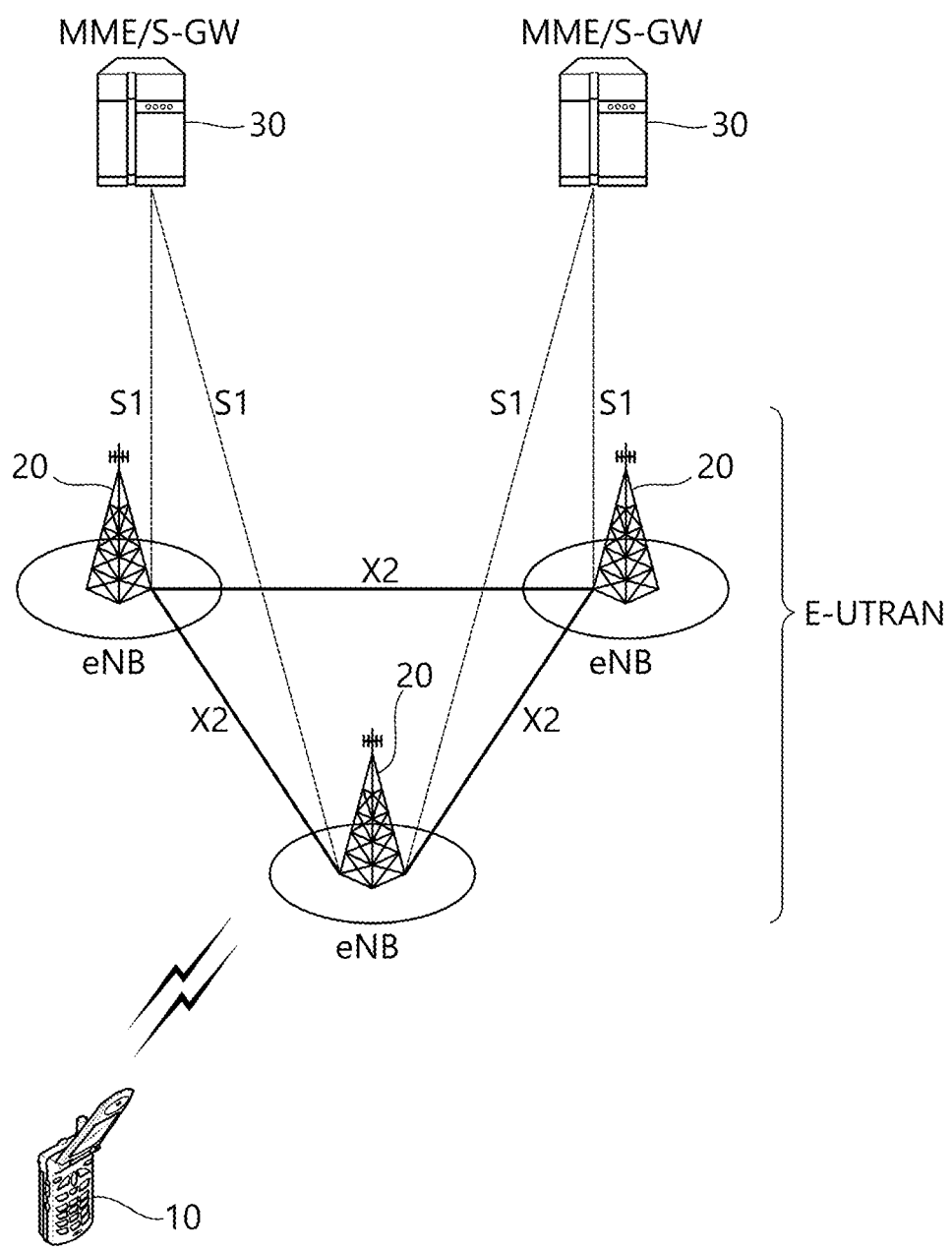
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
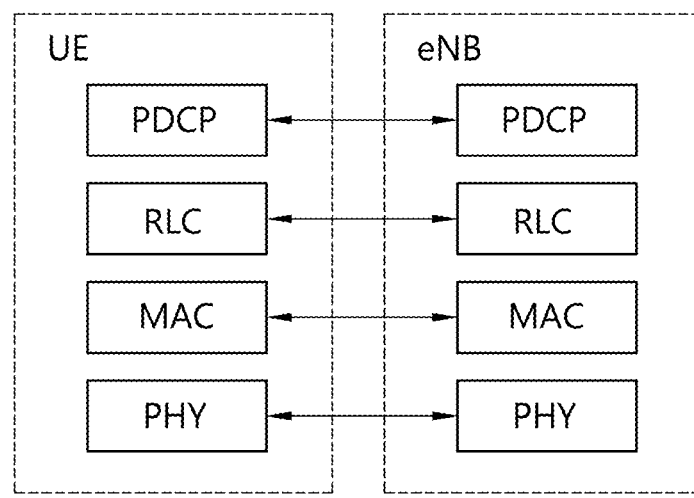
FIG. 2 is a diagram showing a radio protocol architecture for a user plane.
Figure 3:
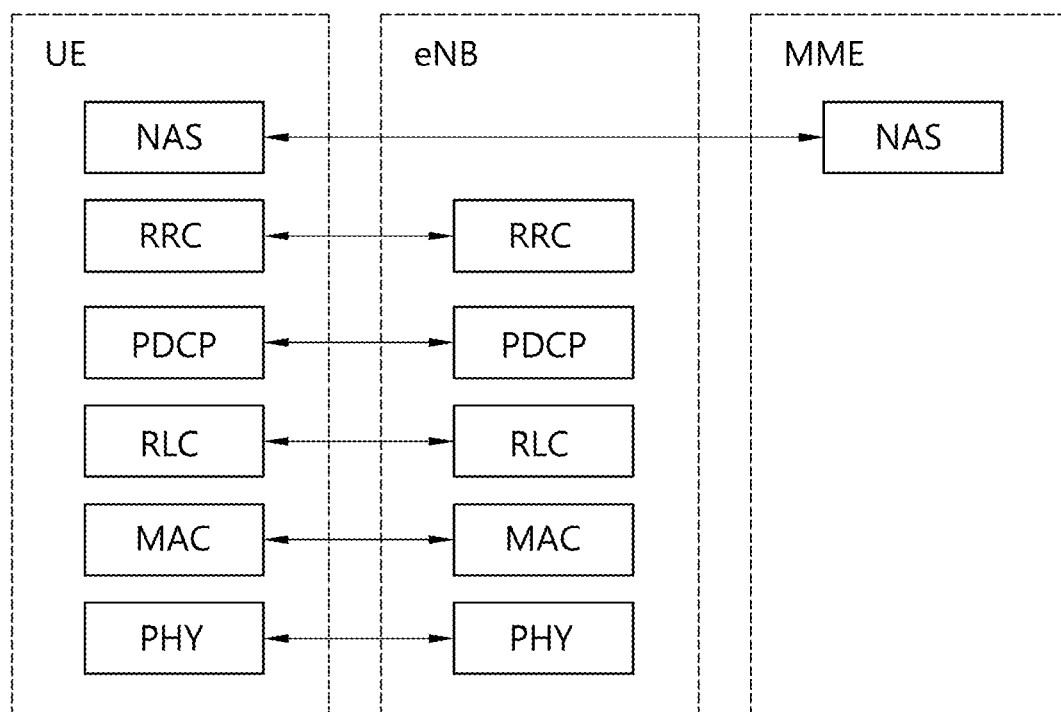
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
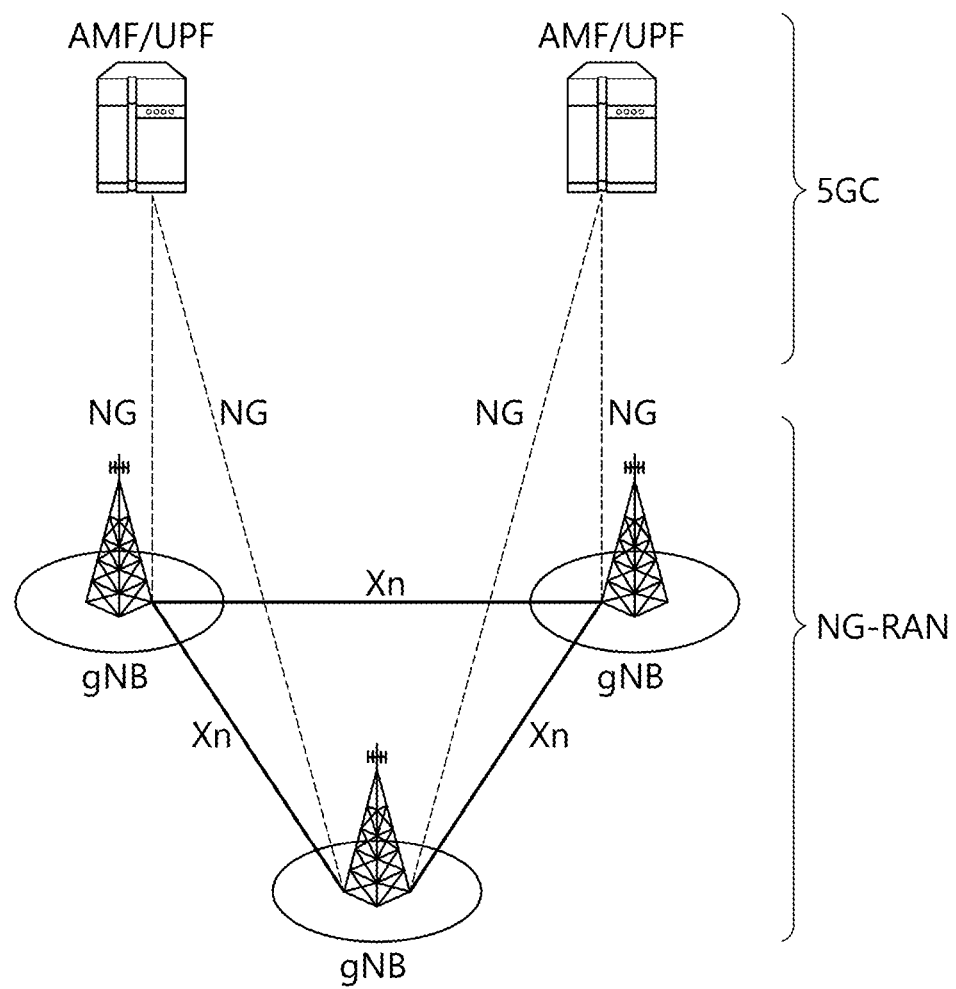
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
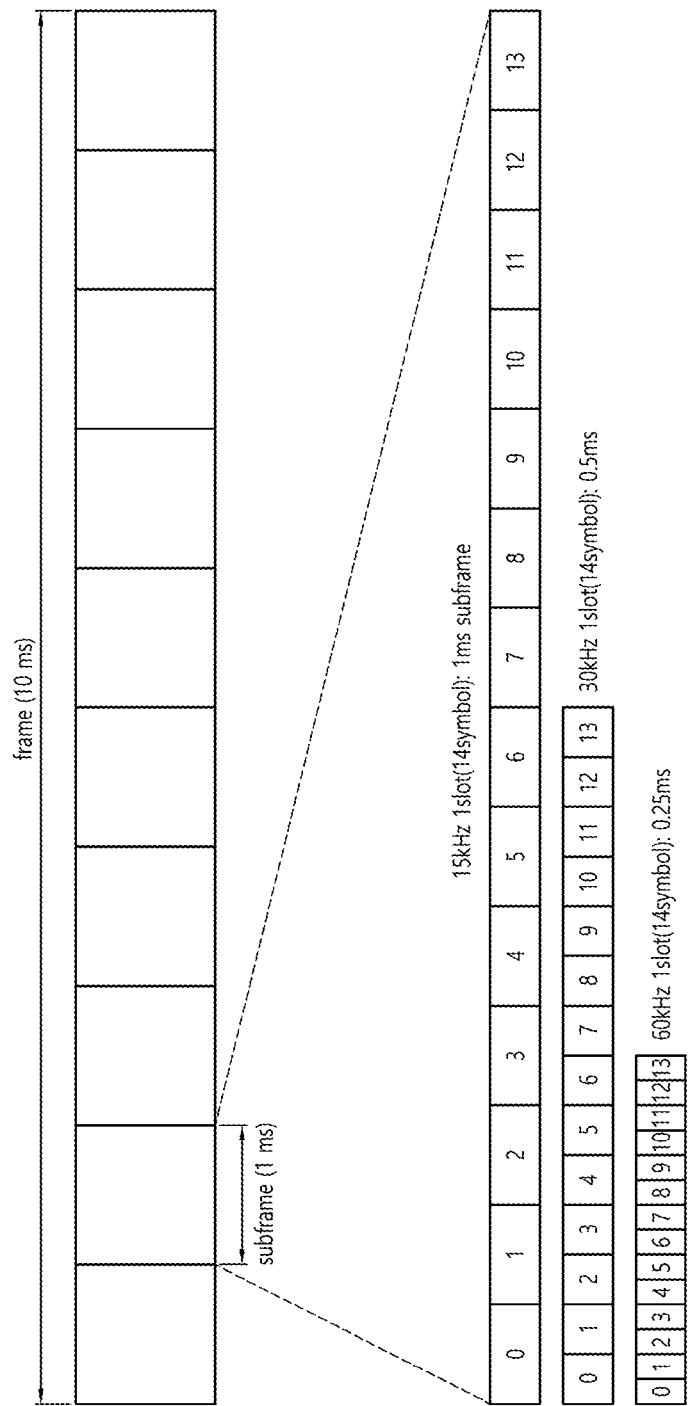
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table illustrates a subcarrier spacing configuration $\mu$.

TABLE 1

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |

TABLE 1-continued

| $\mu$ | $\Delta f = 2^\mu \cdot 15[kHz]$ | Cyclic prefix |
|---|---|---|
| 3 | 120 | Extended |
| 4 | 240 | normal |

The following table illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, $\mu=0, 1, 2$ is illustrated.

A slot may include a plurality of orthogonal frequency division multiplexing (OFDM) symbols. The plurality of OFDM symbols in a slot may be classified into downlink (indicated by D), flexible (indicated by X), and uplink (indicated by U). A format of the slot may be determined depending on which of the D, X, and U the OFDM symbols in the slot are configured.

The following table shows an example of a slot format.

TABLE 3

| for-mat | Symbol number in a slot | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | X | U | U |
| 32 | D | D | D | D | D | D | D | D | D | X | X | X | U | U |
| 33 | D | D | D | D | D | D | D | D | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |

TABLE 3-continued

| for-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | U | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | U | D | X | X | X | X | X | X | U |
| 53 | D | D | X | X | X | U | D | D | X | X | X | X | X | U |
| 54 | X | X | X | X | X | X | D | D | D | D | D | D | D | D |
| 55 | D | D | X | X | X | U | U | U | D | D | D | D | D | D |
| 56-255 | Reserved | | | | | | | | | | | | | |

A format of a slot of a terminal may be configured through higher layer signaling, through a DCI, or on the basis of a combination of higher layer signaling and the DCI.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
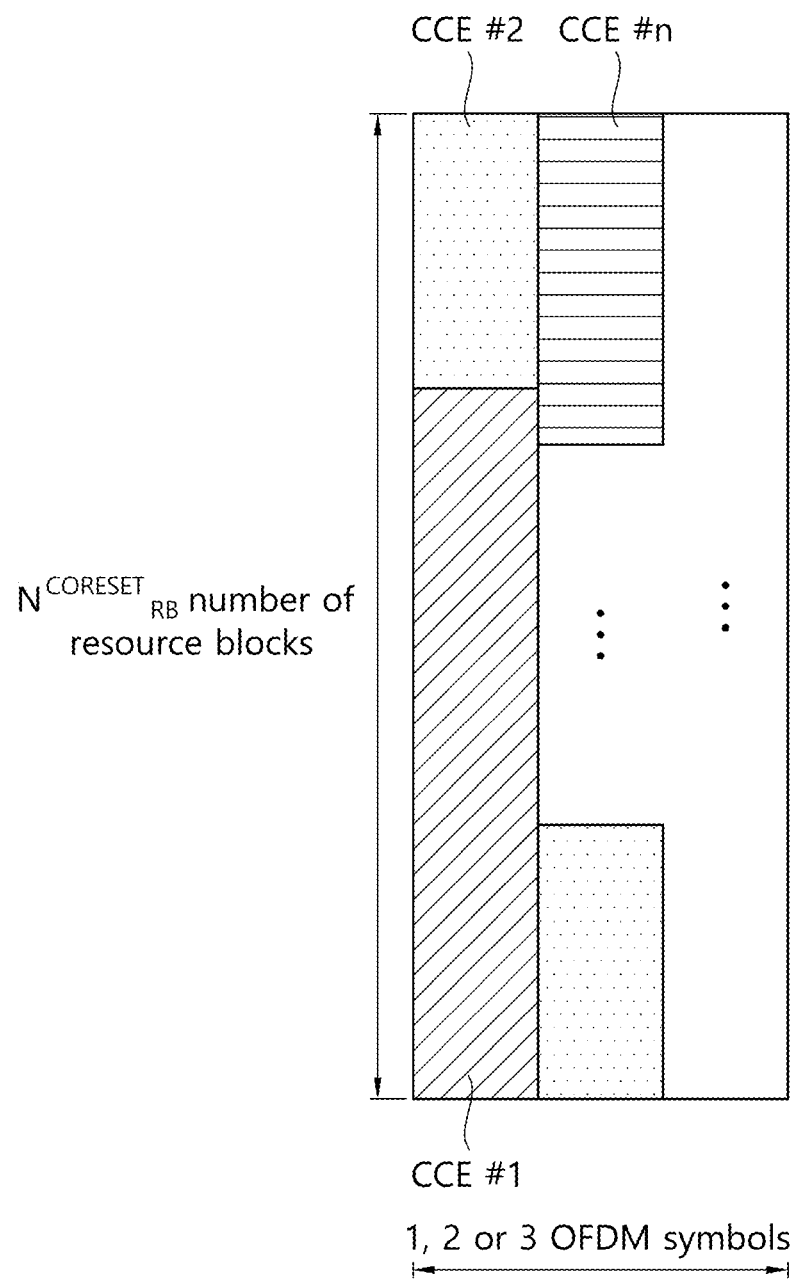
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
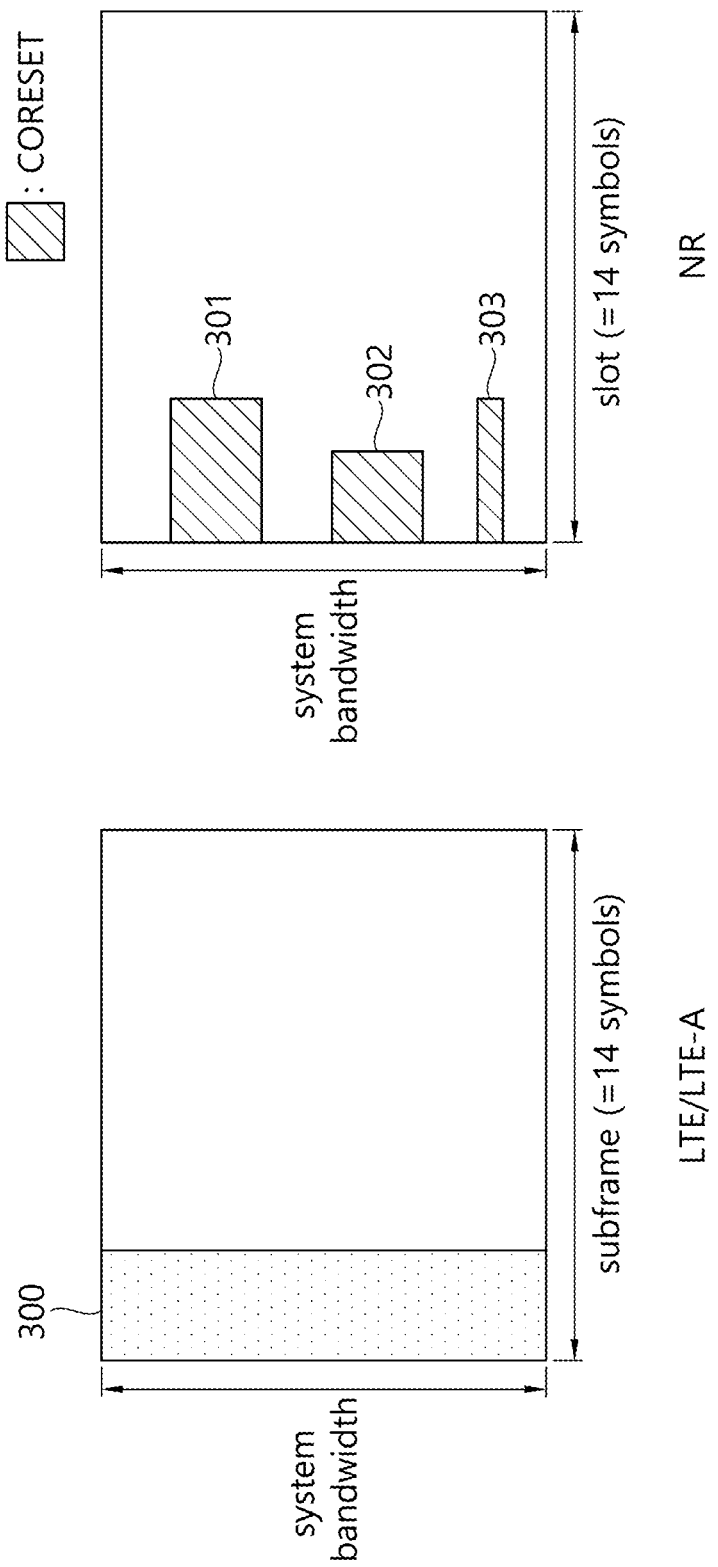
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
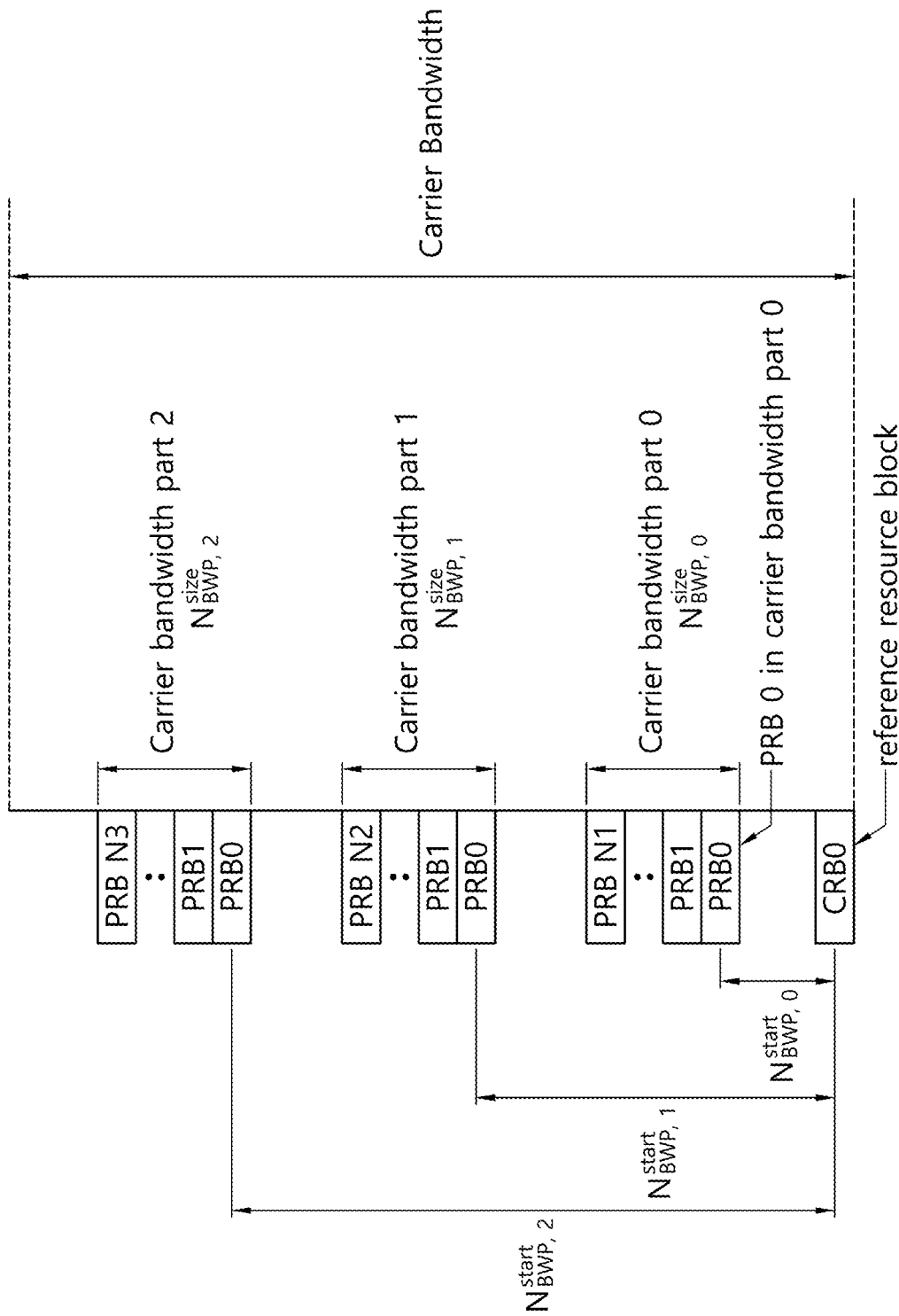
FIG. 8 illustrates carrier bandwidth parts newly introduced to NR.

FIG. 8 illustrates carrier bandwidth parts newly introduced to NR.

Referring to FIG. 8, a carrier bandwidth part may be simply referred to as a bandwidth part (BWP). As described above, various numerologies (e.g., various subcarrier spacings) may be supported for the same carrier in future wireless communication systems. NR may define a common resource block (CRB) for a given numerology in a given carrier.

A bandwidth part is a set of consecutive physical resource blocks (PRBs) selected from consecutive subsets of common resource blocks (CRBs) for given numerology in a given carrier.

As illustrated in FIG. 8, a common resource block may be determined depending on which numerology, e.g., which subcarrier spacing, is used for which carrier bandwidth. The common resource block may be indexed (starting from 0) from a lowest frequency of a carrier bandwidth, and a resource grid (which may be referred to as a common resource block resource grid) with a common resource block as a unit may be defined.

The bandwidth part may be indicated on the basis of a CRB having a lowest index (which may be referred to as "CRB 0"). The CRB 0 having the lowest index may also be referred to as "point A".

For example, under a given numerology of a given carrier, an i-th bandwidth part (BWP) may be indicated by $N^{start}_{BWP,i}$ and $N^{size}_{BWP,i}$. $N^{start}_{BWP,i}$ may indicate a starting CRB of the i-th BWP based on CRB 0, and $N^{size}_{BWP,i}$ may indicate a size of the i-th BWP in the frequency domain (e.g., in units of PRBs). PRBs of each BWP may be indexed from zero. Indices of the CRB of each BWP may be mapped to the indices of the PRBs. For example, mapping may be performed such that $n_{CRB}=n_{PRB}+N^{start}_{BWP,i}$.

In downlink, up to four downlink bandwidth parts may be configured for a UE, but only one downlink bandwidth part may be activated at a given time. The UE does not expect to receive a PDSCH, a PDCCH, a CSI-RS, and the like, in any downlink bandwidth part other than the activated downlink bandwidth part. Each of the downlink bandwidth parts may include at least one CORESET.

In uplink, up to four uplink bandwidth parts may be configured for the UE, but only one uplink bandwidth part may be activated at a given time. The UE does not transmit a PUSCH, a PUCCH, or the like, in any uplink bandwidth part other than the activated uplink bandwidth part.

NR operates in a broadband as compared with the conventional system, and not all terminals may support such a broadband. The bandwidth part (BWP) features that even a terminal that may not be able to support the broadband is operable.

A resource allocation type will now be described. The resource allocation type specifies how a scheduler (e.g., a BS) allocates resource blocks for each transmission. For example, when a BS allocates a bandwidth including a plurality of resource blocks to a UE, the BS may inform the UE about resource blocks allocated to the UE through a bitmap composed of bits respectively corresponding to the resource blocks of the bandwidth. In this case, flexibility of resource allocation may be increased but the amount of information used for resource allocation is disadvantageously increased.

Considering these advantages and disadvantages, the following three resource allocation types may be defined/used.

1) Resource allocation type 0 allocates resources through a bitmap, and each bit of the bitmap indicates a resource block group (RBG) instead of a resource block. That is, in the resource allocation type 0, resource allocation is performed in units of resource block groups, rather than by resource block levels. The following table illustrates sizes of RBGs in use when a system band consists of $N^{DL}_{RB}$ number of resource blocks.

TABLE 5

| System Bandwidth $N_{RB}^{DL}$ | RBG Size (P) |
|---|---|
| ≤10 | 1 |
| 11-24 | 2 |
| 25-63 | 6 |
| 64-110 | 12 |

2) Resource allocation type 1 is a method of allocating resources in units of RBG subsets. One RBG subset may include a plurality of RBGs. For example, RBG subset #0 includes RBG #0, 3, 6, 9 . . . , RBG subset #1 includes RBG #1, 4, 7, 10, . . . , RBG subset #2 includes RBG #2, 5, 8, 11, . . . , and so on. The number of RBGs included in one RBG subset and the number of resource blocks (RB) included in one RBG are configured to be equal. Resource allocation type 1 indicates which of the RBG subsets is used and which RB is used in the RBG subset being used.

3) Resource allocation type 2 is a method of allocating resources in a manner of informing about a starting position (RB number) of an allocated bandwidth and the number of consecutive resource blocks. The consecutive resource blocks may start from the starting position. However, it is to be understood that the consecutive resource blocks are not necessarily physically consecutive but may mean that the logical or virtual resource block indexes are consecutive.

In the future wireless communication system, the number of resource blocks constituting the RBG (or group of RBs) may be changed flexibly. Here, information for the RBG, e.g., information indicating the number of resource blocks constituting the RBG, may be transmitted through a scheduling DCI, third physical layer (L1) signaling, or higher layer signaling such as an RRC message.

In addition, in the future wireless communication system, resource allocation information may include information on a time domain in addition to information on a frequency domain, and which information is included, in which manner information is included, and the like, may also be changed flexibly.

The present disclosure proposes a resource allocation method for a PDSCH and/or a PUSCH when a field size and/or an analysis method for resource allocation vary. In the following embodiments, a RBG-based bitmap scheme is assumed when the size of the RBG is flexible for convenience of explanation, but it may also extend to a case where resource allocation granularity is changed and/or to a case where a resource allocation scheme is changed accordingly, and the like.

In an embodiment of the present disclosure, a resource allocation scheme (particularly, the contents of the RBG size or the grid) may be applied to a resource region that may be mapped to at least only a PDSCH or a PUSCH. Other resource allocation techniques (RBG size or grid) may be applied in other resource regions. For example, when a specific resource of a PDCCH region is used for PDSCH mapping, the RBG size in the corresponding region and other RBG sizes may be independently set or indicated.

In another example, when resource allocation of a PDSCH or a PUSCH is performed on a plurality of carriers or bandwidth parts, RBG sizes may be differently or independently set/indicated for each carrier or bandwidth part.

In the embodiment of the present disclosure, the situation in which size of the RBG is flexibly changed (or the situation indicated in the DCI) is assumed, but the present disclosure may also be extendedly applied to a situation in which the number of RBGs that may be indicated by a resource allocation (RA) field is flexibly changed (or a situation indicated in the DCI).

<Dynamic Field Size for Time and/or Frequency Resource Allocation>

In the following embodiments, the RBG may be considered as a value representing frequency-domain granularity. The RBG size may be flexibly changed. Thus, when the RBG is used, a resource allocation field size of the frequency domain may also be flexibly changed.

It may be advantageous for the RBG size to be large to indicate a large area (e.g., the entire terminal bandwidth or a system bandwidth) by a frequency axis. Meanwhile, it may be advantageous for the RBG size to be small to indicate a small area (e.g., one or several physical resource blocks) by the frequency axis.

In case where scheduling flexibility is maintained to the maximum by the frequency axis, a required resource allocation field size may be excessively increased if the RBG size is small (as compared with a large RBG size).

For example, when the RBG size is set to 10 in a bandwidth BW composed of 50 physical resource blocks (PRBs), a frequency axis resource allocation field of the bitmap scheme may be composed of 5 bits. Meanwhile, the frequency axis resource allocation field may be composed of 25 bits, if the RBG size is 2.

The resource allocation field is included in a DCI. It may be advantageous to equally maintain the entire DCI size or the entire resource allocation field size in terms of blind decoding/detection from a position of the UE.

Bits of the resource allocation field varied according to selection of an RBG size may be mainly used to perform time domain resource allocation. Depending on the indicated RBG size, an allocation method for time and/or frequency domain resources may be different.

The following is an example of a resource allocation scheme according to RBG sizes. All or some combinations of the following schemes may be used for time and frequency resource allocation.

1) If the RBG size is equal to or smaller than a specific level ($N_{low}$), indication of the resource allocation field may be limited to resources of the frequency domain. The specific level may be a preset default RBG size or may be set in a higher layer.

When the RBG size is equal to or smaller than the specific level, resource allocation in the time domain is previously determined or may be performed on the entire PDSCH mapping area or the PUSCH mapping area determined by higher layer signaling or by a slot type format (on a time axis). Alternatively, a time domain resource as a target of resource allocation may be separately indicated by higher layer signaling, information regarding a slot type format, and the like.

If a default time domain resource is used, the default time domain resource may be previously determined (e.g., PDSCH or PUSCH in the entire slots) or if slot type-related information is dynamically indicated, time domain information may be dynamically changed in the slots according to the slot type-related information. Or, in case where slot type-related information is transmitted, a starting point and a duration of the PDSCH or the PUSCH may be configured in advance by high layer signaling to ensure reliability. Or, even in case where the slot type-related information is not transmitted, higher layer signaling may be similarly considered.

2) If the RBG size exceeds the specific level ($N_{high}$), indication of the resource allocation field indicates may be limited to resources in the time domain. More specifically, the RBG size may be the same as or equivalent to the system bandwidth or the terminal bandwidth. In this case, in resources allocation in the frequency domain, any one RBG may be allocated for either PDSCH or PUSCH transmission (for the indicated RBG size).

3) When the RBG size is within a specific range (e.g., when the RBG size is between $N_{low}$ and $N_{high}$), the resource allocation field may indicate time and frequency resources. More specifically, some of the bits of the resource allocation field may be used to indicate frequency domain resource allocation, and the other bits may be used to indicate time domain resource allocation.

For example, the frequency domain resource allocation may indicate an RBG to be allocated with an indicated RBG size. The time domain resource allocation may indicate which are to be allocated by a predetermined or indicated time-domain scheduling unit. Alternatively, the time domain resource allocation may be provided in the form of a pattern, and the number of the patterns may be different according to a change of the bits for the time domain resource allocation.

Alternatively, time domain resource allocation and frequency domain resource allocation may be jointly performed. Specifically, the information on the allocated time and frequency resource pairs may be configured in the form of a plurality of patterns. Also, bits of the entire resource allocation fields may indicate the patterns.

A method for implementing this is as follows. A plurality of bandwidth parts may be configured for the UE, and each bandwidth part may be configured by a set of consecutive PRBs, an RBG size to be used, and a size of a time domain resource allocation. A bandwidth part index used in a DCI may be informed, and the RBG size, time information used in each bandwidth part when each bandwidth part is indicated, and the like, may be used for resource allocation.

That is, selection for the bandwidth part may represent selection of a scheduling unit of time and/or frequency resources when resources are allocated. Bandwidth parts which may be used together (i.e., bandwidth parts which may be dynamically changed to one DCI size), among the configured bandwidth parts, may be configured as a bandwidth part group for the UE, and it may be assumed that a bit size of a resource allocation field in the bandwidth part group is determined according to a size of a largest resource allocation field in each bandwidth part group.

Such a configuration may be combined with a dynamically changing bandwidth part. It may be assumed that the bandwidth part groups share a CORESET. In this case, when the CORESET is changed, the size of the DCI to be scheduled may be changed, and thus, a case where the resource allocation field is dynamically changed as the CORESET is shared, and the like, is taken into consideration.

Or, in such a configuration, it may be expected that, while the bandwidth part groups share the CORESET(s), the UE does not match a baseband bandwidth. It may be assumed that the baseband of the UE is not changed to match a maximum value of the bandwidth part group within the bandwidth part group.

Or, in such a configuration, higher layer signaling may be possible as to whether the UE may assume a band change or retuning delay between a control signal and data may be assumed. If delay assuming a bandwidth change is not configured, it may be assumed that the bandwidth is not changed but is adjusted to the maximum value.

Alternatively, one bandwidth part may be configured and a set of time/frequency schemes of DCI resource allocation which may be indicated in the CORESET(s) of the corresponding bandwidth part may be configured. For example, when the bandwidth part is composed of 200 resource blocks, the set of time/frequency schemes may be composed of band, RBG size, time domain resource allocation information, and the like.

For example, the set of time/frequency schemes may be defined as: entry 1=(200 RB (bandwidths), 10 RB (RBG size), starting OFDM symbol (4 bits), 4 slots (2 bits)) entry 2=(16 RBs (bandwidths) starting from 100th RB, 1 RB (RBG size), 0 for time-domain resource allocation), and the like.

4) A method for indicating different RBG sizes or time-frequency resource allocation schemes when there are multiple RBG size candidate values may be as follows.

i) Explicit bits may be used in a DCI. ii) A DCI may be interpreted differently depending on a CCE index to which the DCI is mapped. This mapping may be configured by higher layer signaling or may be a value which is always set. iii) Or, scrambling of a DCI or CRC may be used.

5) When there are several time/frequency resources, the UE may be controlled to simultaneously monitor the CORESETs configured in several bandwidth parts in order to dynamically change the several time/frequency resources. Resource allocation methods used for each CORESET may be different.

For example, CORESETs may be configured in a 200 RB bandwidth part and 10 RB bandwidth part, respectively, and a required bit size of the resource allocation field for each CORESET may be assumed for scheduling 200 RB and 10 RB. More generally, bandwidth and resource allocation information of data that may be scheduled for each CORESET may be configured.

More specifically, regarding the aforementioned schemes, the entire bit field size for time and frequency resource allocation may be the same. In this case, resource allocation for the frequency domain may indicate a resource allocated through a bitmap scheme for a given RBG size, or may indicate an RIV scheme based on a given RBG size as a basic unit (i.e., a scheme of indicating the number of RBs or RBGs consecutive with a starting RB or RBG index).

In this case, resource allocation for the time domain may be a starting time-domain scheduling unit index, an ending time-domain scheduling unit index, and/or a consecutive number of time-domain scheduling units for the PDSCH or the PUSCH.

The time-domain scheduling unit may be a symbol (reference numerology or a numerology reference for DCI), a plurality of symbols, or a mini-slot. When a size of the symbol group is set and a scheduling unit is configured based on the size of the symbol group, the size of a specific symbol group may be different from the size of another symbol group according to the number of symbols constituting a slot.

Alternatively, a pattern for a symbol group in a slot or a plurality of slots may be configured in advance according to an instruction from a BS, or resource allocation may be performed based on a starting unit as a corresponding unit and the number of corresponding units.

For example, the symbol group pattern may be different according to a control region configuration (e.g., the number of symbols in the time domain). For example, a symbol group pattern in a slot composed of seven symbols may be any of (3, 2, 2), (1, 2, 2, 2), (2, 2, 2, 1), (2, 2, 3), and (2, 3, 2).

Information regarding the start/end/interval may exist in the form of a pattern and a resource allocation bit field may be used to indicate a corresponding pattern. More specifically, the information regarding the pattern may be indicated by the BS (via higher layer signaling or a third PDCCH).

As an example of the pattern, an RIV scheme (a scheme of indicating a starting symbol index and the number of consecutive symbols) may be used. If the bit field size for the time domain resource allocation changes according to the RBG size, resource allocation may be performed in a state in which some bits of the RIV scheme are fixed to a specific value (e.g., 0 or 1), or in the RIV scheme, a basic unit may be increased (e.g., performed based on a plurality of symbols in one symbol period).

<Fixed Field Size for Time and/or Frequency Resource Allocation>

At the time of resource allocation, if the RBG size is changed while the bit size of the resource allocation field is the same, a combination of resources which may be allocated may become different.

The RBG size may be changed by at least one of 1) directly indicated in a DCI, 2) changed according to a change in a bandwidth part, or 3) changed according to a bit size of resource allocation field.

Specifically, a bit field for frequency resource allocation may be configured on the basis of a specific RBG size. For example, the size of the bit field may be determined based on a maximum RBG size that may be set.

In the future wireless communication system, the BS may indicate a bit size of a resource allocation field. For the specific RBG size or a greater RBG size, resource allocation may be performed flexibly for all the RBGs in the system bandwidth, terminal bandwidth, or the configured bandwidth part.

If the indicated RBG size is smaller, resource allocation may be performed on only some RBG sets. More specifically, for example, when a frequency domain resource allocation is configured by a bitmap for an RBG, all RBGs or RBG combinations within a bandwidth given to the corresponding UE may be expressed for a specific RBG size (group). Meanwhile, if the size of the RBG is small, resource allocation may be performed only on some RBG sets within a bandwidth given to the corresponding UE.

In a more specific example, it is assumed that the number of RBGs within the terminal bandwidth for the first RBG size is N and the number of RBGs within the terminal bandwidth for the second RBG size is M. Here, if the first RBG size is larger than the second RBG size, M is greater than N (M>N). However, if the resource allocation field is set based on the first RBG size, only N of the M RBGs or a subset of the M RBGs may be allocated through the resource allocation field for the second RBG size.

At the position of performing resource allocation, the RBG size may be set to be large to allocate more frequency resource, and conversely, the RBG size may be set to be small to allocate small frequency resources.

Or, in a situation in which the bandwidth part (BWP) is flexibly changed, when the bit sizes of the scheduled BWP and the scheduled BWP are different, in the present disclosure, resource allocation may be performed on the scheduled BWP with the bit size of the resource allocation field of the scheduling BWP.

When the RBG size is small, the amount of resources that may be allocated using the bit size of the limited resource allocation field is limited. In this case, the BS may indicate information for selecting the RBG set to the UE in order to reduce the restriction regarding the resource allocation.

Specifically, the resource allocation field in the frequency domain may include an RBG size indicator, an RBG set indicator in a bandwidth, and/or an RBG indicator in an RBG set.

For example, candidates for the RBG set may be separately indicated to the UE by the BS (e.g., signaling through higher layer signaling and/or an indication through group common PDCCH and/or a third DCI). A specific candidate among the candidates for the RBG set may be indicated by the DCI scheduling the corresponding PDSCH or PUSCH.

The RBGs in the RBG set may be configured to be localized (i.e., adjacent to each other) or distributed (i.e., separated from each other) according to a base station configuration.

In a simple example, the BS may configure the candidate(s) for the RBG set through signaling through higher layer signaling such as an RRC message, and/or PDCCH and/or a third DCI, and the corresponding scheme may be in the form of a bitmap for the RBGs within the terminal bandwidth or the system bandwidth.

Therefore, the BS may map a plurality of consecutive RBGs to the same RBG set for localized resource allocation or may map a plurality of non-consecutive RBGs to the same RBG set for distributed resource allocation.

Alternatively, the RBGs to be indicated may include the number of RBGs that may be represented according to a bit size of the resource allocation field of the scheduling BWP from a lowest RBG of the scheduled BWP.

In case where the number of PRBs constituting the RBGs is relatively small according to the bandwidth part (BWP) and/or the number of PRBs that may actually be used for data mapping in the RBG is relatively reduced due to a reserved resource, or the like, the corresponding RBG may be excluded from the RBG set as the target of the indication. The relatively reduced RBG size may refers to a case where the RBG size becomes smaller than the set RBG size according to the size of the bandwidth part (BWP).

The above description may be applied regardless of resource allocation type. Alternatively, the resource allocation type of the bitmap scheme may follow a scheme of a case where a bit size of a required resource allocation field and a bit size of an actual resource allocation field are different as in the above scheme. In the resource allocation type of the RIV scheme, a bit size of a resource allocation field may be configured based on a largest bandwidth part or based on a largest bandwidth part in the configured bandwidth part. The reason is because, in the case of RIB scheme, a bit size difference of the resource allocation field may be slight according to a bandwidth part size.

Alternatively, a plurality of RBG sizes may be used to indicate resources in resource allocation. In a specific example, when the bandwidth part is composed of a plurality of RBGs, the size of a specific RBG may be set to follow the set RBG size (including+/−1 difference) and the size of the other specific RBG may be set to include all the remaining PRBs of the bandwidth part.

For example, it is assumed that the bandwidth part is composed of 50 PRBs, the bit size of the resource allocation field is 5 (bits), and the RBG size is 5 PRBs. In this case, for example, the RBG configuration for the bandwidth part may be composed of four RBGs having a size of 5 PRBs and one RBG having 30 PRBs. In the above scheme, there may be a problem that the specific RBG size is excessively large.

Alternatively, in a state in which the bit size of the resource allocation field and the size of the bandwidth part are set or given, when the RBG size and the number of the RBGs are set, a difference between the configured RBGs may be considered to be 1 (PRB) or less. Specifically, when the bandwidth part is composed of N PRBs and the bit size of the resource allocation field is set to M bits, in the RBGs constituting the bandwidth part, an RBG having a size of Ceil(N/M) may be M*Ceil(N/M)−N, and an RBG having a size of Floor(N/M) may be M−(M*Ceil(N/M)−N). Regarding order in which the RBGs having different sizes are arranged, the RBGs having the same RBG size are first arranged and RBGs having different RBG sizes may be arranged.

In order to match the RBG sizes to be the same to the maximum in different manners, most RBGs (excluding a specific one among all the RBGs) may be configured to have a size of Ceil(N/M) or Floor(N/M), and the size of the other remaining (one) RBG may be configured to include the other remaining PRBs (e.g., configured to have a size of N−(M−1)*Ceil(N/M) or N−(M−1)*Floor(N/M), for example). For example, it is assumed that the bandwidth part is composed of 50 PRBs (N=50) and the bit size of the resource allocation field is 13 (bits) (M=13). In this case, the RBG configuration for the bandwidth part is composed of 12 RBGs having a size of 4 PRB (=ceil (50/13)) and one RBG having 2 PRBs (=50−12*4).

In the above examples, the resource allocation (interpreting) method according to the RBG size in the frequency domain has been described, but it may also extend to a method of allocating (interpreting) resources according to a scheduling (time) unit in the time domain. Similarly, resource allocation for the time domain may be configured for a specific scheduling unit, and resource allocation may be performed according to a scheduling unit value which is flexibly changed. More characteristically, the RBG set indicator may be represented in units of time and/or frequency resource scheduling unit.

For example, the RBG set indicator may include information on RBGs constituting an RBG set and information on a starting symbol index and/or duration, and the like.

Alternatively, a basic time and frequency resource unit may be selected for each RBG in the scheduling unit of the time domain. Or, resource allocation (or the scheduling unit) may not be flexibly changed for the time axis.

In another scheme, resource allocation regarding the frequency domain is performed on a specific RBG set, and allocation information for the specific RBG set may be equally applied to a plurality of RBG sets in the bandwidth. For example, when all RBGs are configured as a plurality of RBG set forms, it may be considered that the bitmap information for a specific RBG set is applied to each of the other RBG sets in the same manner.

In this embodiment, a bandwidth may be a system bandwidth (system BW) or a UE bandwidth and may be replaced with a bandwidth part. If a plurality of bandwidth parts are configured for a specific UE, bandwidth part indicator information may be transmitted, the RBG set may be limited to a corresponding bandwidth part, or the RBG set itself may include RBGs of a plurality of bandwidth parts.

In another scheme, for example, two resource allocation types may be dynamically configured. Hereinafter, the frequency domain will be described, but it may also be applied to resource allocation in the time domain and to time/frequency domain resources.

1) Resource allocation type 0: Bitmap having a bit size of RBG size K+floor(M/K), where M is the number of PRBs for the bandwidth configured in the bandwidth part.

2) Resource allocation type 1: Bitmap having a bit size of bitmap size of RBG size+p*K+floor (M/p*K)

Figure 9:
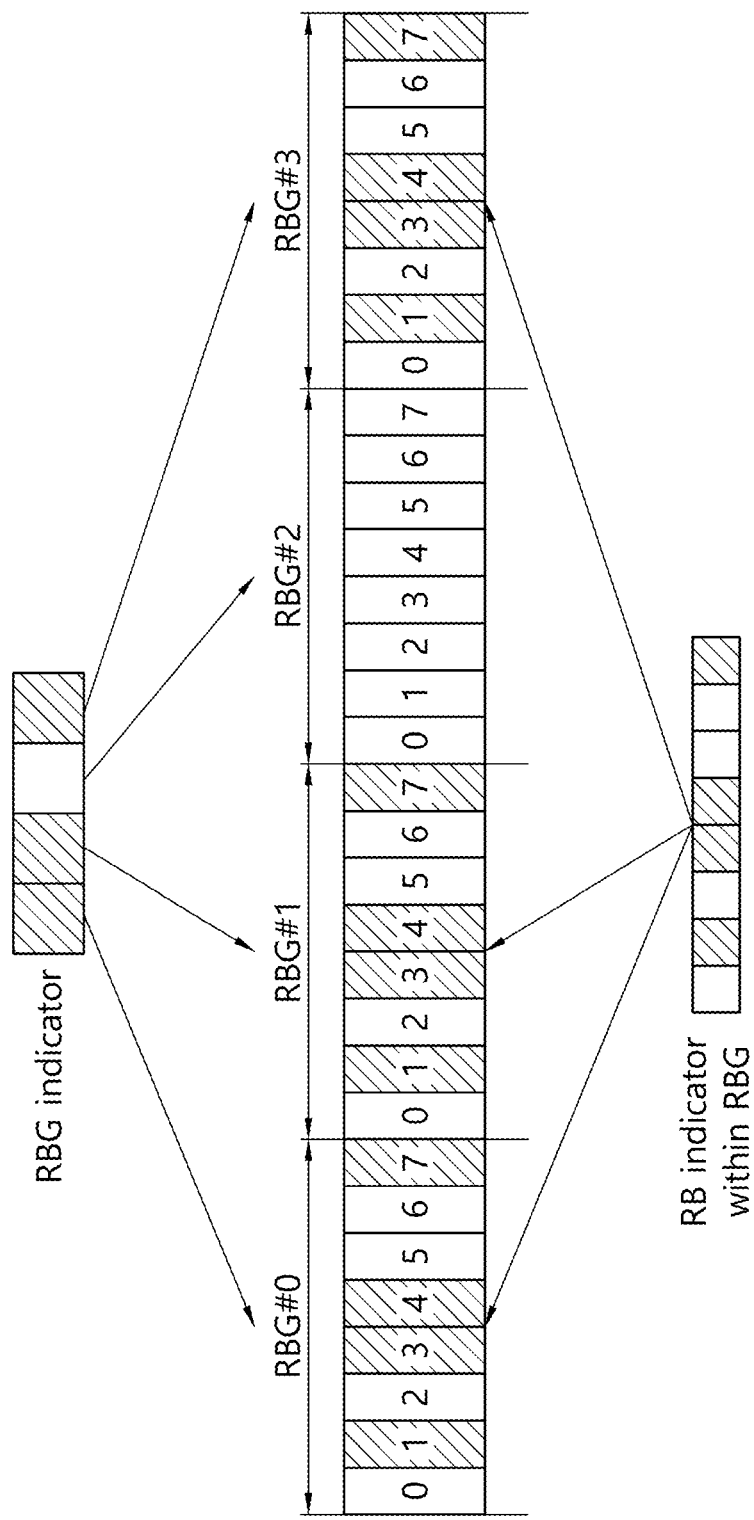
FIG. 9 illustrates an example of resource allocation type 1.

FIG. 9 illustrates an example of resource allocation type 1.

Referring to FIG. 9, in the resource allocation type 1, resources of RB-level may be allocated by increasing an RBG size, giving a bitmap (RBG indicator) regarding which of the RBGs is selected, and providing (another) bitmap (RB indicator in an RBG) in one RBG size. The bitmap in the RBG size is commonly applicable to selected RBGs.

The above-described methods may be used in combination. For example, in order not to significantly increase the bit size of the frequency domain, a set of allocatable RBs may be different according to the RBG size and the resource allocation scheme of the time domain may be changed.

In the future wireless communication system, in performing the time domain resource allocation, a starting symbol index and/or a last symbol index for a PDSCH or a PUSCH may be indicated to the UE through scheduling DCI.

More specifically, the starting symbol index and/or the last symbol index may be indicated separately in symbol units or symbol group units constituting a slot or the starting symbol index and the last symbol index may be combined to be joint-indicated. For example, the starting symbol index and/or the last symbol index may be combined to be indicated according to an RIV scheme. The RIV scheme may be a scheme of indicating the starting symbol index and a duration.

Further, in the future wireless communication system, the BS may configure a set(s) for a plurality of time domain resources through RRC signaling, and each set may include a combination of slot index information to which the PDSCH/PUSCH is mapped, and/or starting symbol index, and/or the last symbol index. By indicating through a scheduling DCI which schedules one of the configured sets, time domain resource allocation may be performed.

The set(s) configured by the RRC may be set separately from slot format information (SFI) transmitted through the group common PDCCH. The SFI indicates a downlink part, a gap, and/or an uplink part in the slot. Here, since it is assumed that, in the SFI, the downlink part is generally used from a first symbol of the slot, while in the case of the time domain resource allocation, a scheme of not mapping for the first some symbols in order to avoid overlapping with the CORESET (control region) at the time of scheduling the PDSCH or the PUSCH is not excluded, the purpose and scheme are considered to be different.

When the time domain resource allocation is performed based on RRC signaling, it is necessary to determine a time domain resource allocation method before an RRC configuration is established and/or during an RRC reconfiguration period. The following is a more specific embodiment.

1) Parameter set(s) (e.g., a combination of at least one of slot index information, a starting symbol index, and a last symbol index) for a time domain resource may be configured through a physical broadcast channel (PBCH) and/or remaining minimum system information (RMSI) and/or other system information (OSI). In the future wireless communication system, in transmitting minimum system information, a part of the minimum system information may be transmitted through the PBCH, and the remainder, that is, the RMSI, may be transmitted via the PDSCH. More characteristically, in the time domain resource allocation of the above scheme, the scheduling DCI may belong to a common search space or a group common search space. The common search space may be a search space for RMSI and/or OSI transmission.

2) Dynamic time-domain resource allocation may not be performed. In this case, it may be a fixed value in the case of the slot index, and a different value may be set for the PDSCH and the PUSCH. For example, the PDSCH may be transmitted in the same slot as the PDCCH, and the PUSCH may be transmitted after four slots from the PDCCH. In the case of the starting symbol index, it may be designated by a symbol following the CORESET interval. More characteristically, for the PUSCH, the starting symbol index may be set via higher layer signaling (PBCH and/or RMSI and/or OSI) and/or DCI indication or may be configured to start from a first symbol of the configured slot. In the case of the last symbol index, it may be configured via higher layer signaling (PBCH and/or RMSI and/or OSI) and/or DCI indication or may be configured by a last symbol of the slot. More specifically, in the time domain resource allocation of the above scheme, the scheduling DCI may belong to the common search space or the group common search space. The common search space may be a search space for RMSI and/or OSI transmission.

In the future wireless communication system, the PDSCH or the PUSCH may be scheduled over a plurality of slots through multi-slot aggregation. In such a situation, time domain resource allocation may need to be expanded to indicate for aggregated slots. The following is a more specific example of a time domain resource allocation method in a multi-slot aggregation situation.

1) Set(s) for time domain resources over multiple slots are configured through RRC signaling. Each of the above sets may include a combination of a slot index at which mapping of the PDSCH or PUSCH may start and/or a last slot index, and/or the number of slots to be aggregated and/or a starting symbol index for each aggregated slot and/or a last symbol index for each aggregated slot, and the like. The RRC configuration may be configured when a multi-slot aggregation operation is configuration and may be configured independently of the RRC configuration for the time domain resource allocation for one slot or may be configured as a superset including the same.

2) A set of time domain resources for one slot case may be utilized for aggregated slots. The starting symbol index in the characteristically (finally by DCI) indicated set may be applied in common to each of the aggregated slots. In the case of the CORESET interval it may be regarded as a suitable method because it may not be considered to be changed in the aggregated slots. The last symbol index in the next indicated set may be applied to a specific aggregated slot. Characteristically, the specific slot may be the last or first slot of the aggregated slots. The last slot index for the remaining aggregated slots may be configured by at least one of (1) RRC signaling, (2) RRC signaling and DCI indication (which may be in the form of SFI or SFI pattern), (3) SFI for the corresponding slot (received from the group common PDCCH), and (4) an SFI pattern for the corresponding slots (received from the group common PDCCH).

<Compact Frequency Resource Allocation>

The future wireless communication systems may support an application field requiring high reliability. In the above situation, the amount of DCI transmitted on the PDCCH may be reduced. More characteristically, it is necessary to efficiently reduce the size of a specific field (in particular, the resource allocation field) of the contents of the DCI.

Resource allocation may use an RIV scheme (i.e., a scheme of expressing the number of RBs consecutive with the starting RB index or a specific RB set by the number of RB sets consecutive with the starting RB set). The scheme may reduce a bit size required for resource allocation by expressing only consecutive resource allocation.

In order to effectively manage multiplexing between different PDSCHs or PUSCHs in the network viewpoint, it is necessary to configure scheduling granularity to the RBG size. In a specific example, in the LTE system, information regarding a step size or information regarding an RBG size at the time of compact resource allocation may be configured to have a specific RBG size (e.g., an RBG size configured to interwork with a bandwidth) or may be indicated to the UE by the BS (through at least one of higher layer signaling, a group common PDCCH or a third DCI). A specific RBG may be greater or smaller than the configured RBG size according to a size of a system bandwidth, a terminal bandwidth, or a bandwidth part. The specific RBG may also be handled/indicated by resources allocated in the same as that of other RBGs. That is, when resource is allocated, the RBG allocated regardless of RBG size may be indicated, and PRBs may be allocated to the indicated RBG according to a size of each RBG. In case where the RBG size is flexibly changed, a total bit size may be set according to a specific RBG size (e.g., a largest value or a smallest value among candidate values or a value indicated by the BS) in order to maintain a total bit size for compact resource allocation.

The scheduling unit in the RIV scheme may be changed according to the RBG size indicated in the above situation. Therefore, if the indicated RBG size is larger than the specific RBG size referred to in the size setting, a specific value (e.g., 0) may be padded to an MSB or an LSB to fit a total bit field size in the bit field for the RIV. Conversely, if the value is small, a configuration in which a single bit or a plurality of bits of the MSB or LSB are cut in the bit field for RIV and in which the cut bits are filled with a specific value (e.g., 0) may be assumed.

Distributed resource allocation and/or frequency hopping may be required to secure frequency diversity, which may be simply performed by applying interleaving after compact resource allocation. In the case of the interleaving scheme, a scheme (or a block interleaver scheme) of inputting in a row-by-row or a column-by-column manner and extracting in the column-by-column manner (or in the row-by-row manner) in a matrix having a specific size may be used. Or, interleaving may be performed based on a pseudo-random function. In the above case, a position of a frequency resource may be shifted based on the random number. More characteristically, the interleaving may be performed within a size of an active bandwidth part in which the PDSCH or the PUSCH is scheduled or may be performed in a separate specific frequency domain (e.g., a region indicated by the BS (through higher layer signaling and/or DCI).

In the above situation, the same hopping pattern and multiplexing between transport channels may be ensured by matching hopping regions equally between terminals having different bandwidth parts.

However, in the case of the above scheme, throughput may be reduced when a difference between the bandwidth part for a specific UE and a hopping area is significant and configuring hopping regions to be orthogonal in a different manner may also be considered.

More specifically, the hopping region may be configured to be non-consecutive, based on which overlapping of hopped resources between different bandwidth parts may be prevented.

In another method, in performing the block interleaving method, the size of the row of the block interleaver may be configured regardless of size of a partial bandwidth (e.g., using third higher layer signaling). More specifically, it may be configured via the PBCH or the RMSI and may be updated by RRC.

In the above case, the row size for the block interleaver may be configured to be the same between different partial bandwidths. More characteristically, the bandwidth of the UE may be divided into X partial regions, and the number of partial regions may be defined as the number of rows of the block interleaver matrix. In this case, a value of a specific region of the matrix may be filled with NULL, and the portion of the NULL may be skipped when the index is extracted in a column-by-column manner. That is, the hopping region may be performed by avoiding the specific region through the above method. More specifically, the method of specifying NULL may be to select a specific row(s) (and/or an offset for elements) for the matrix for the block interleaver, or to select in the form of indicating a starting element and a final element. The above information may be indicated by the base station (e.g., higher layer signaling).

Figure 10:
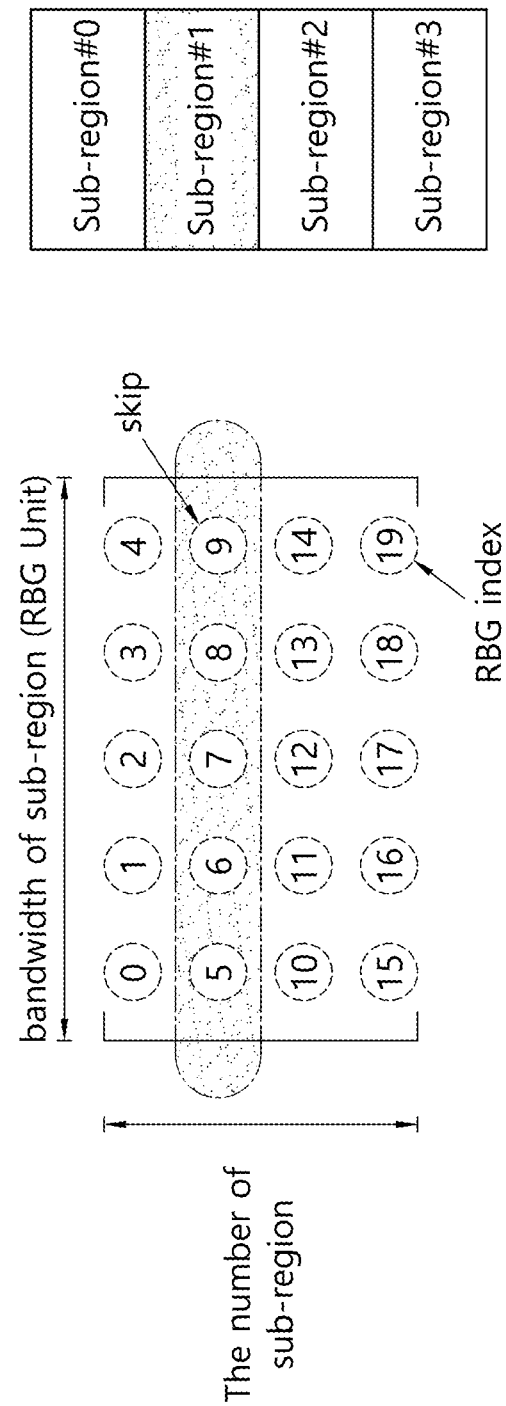
FIG. 10 illustrates an example of hopping region configuration.

FIG. 10 illustrates an example of hopping region configuration.

The pseudo-random scheme may be performed based on a cell identity (ID), partial band-specific information, or third signaling (e.g., virtual ID) have. The above scheme may efficiently support multiplexing between UEs in a cell or a partial band, while supporting inter-cell or partial-band randomization. When multiplexing between different PDSCHs or PUSCHs (in particular, performing RBG-based resource allocation) is considered, it may still be useful to allocate resources in RBG units even after interleaving. That is, the unit of interleaving may be characteristically an RBG unit. The RBG may be equal to or different from the RBG size at the time of the resource allocation indication. That is, the BS may separately indicate the RBG size assumed at the time of resource allocation and the RBG size assumed at the time of interleaving to the UE (e.g., higher layer signaling, group common PDCCH, or third DCI).

Also, depending on inter-slot hopping and/or by slots or symbol groups according to the inter-slot hopping, hopped frequency domain/resource may be different. In performing resource allocation in the above scheme, hopping may be performed based on a slot or a symbol index where the PDSCH or the PUSCH starts in a position of the PRB or resource allocation maybe performed based on a PRB index hopped calculated on the basis of a specific time point (e.g., starting a subframe, starting a frame, etc.) in consideration of multiplexing between several UEs between cells.

More characteristically, the hopping interval in the time domain may be configured to a fixed form (e.g., divided based on a middle point in a slot or a space between seventh and eighth symbols) in consideration of multiplexing between a plurality of terminals. More characteristically, the hopping interval in the time domain may be configured by higher layer signaling (e.g., at least one of PBCH, RMSI, and RRC) and/or in the DCI in consideration of multiplexing between the PDSCH or the PUSCH different in the number of configuration symbols. In the case of performing non-slot-based scheduling, intra-slot frequency hopping may be applied and hopping may not be performed in the non-slot interval.

Alternatively, resource allocation may be performed based on a specific offset within a predetermined hopping region (e.g., an active uplink bandwidth part) or within a hopping region signaled by a higher layer (e.g., PBCH or RMSI or RRC) May be performed on the basis of a reference value.

For example, the PUSCH or the PDSCH transmitted in the PRB N in the first hopping interval may be transmitted in the {(PRB N+offset) mod uplink bandwidth part bandwidth} in the second hopping interval. More characteristically, the hopping interval in the time domain may be configured to a fixed form (e.g., divided based on a middle point in a slot or a space between seventh and eighth symbols) in consideration of multiplexing between a plurality of terminals, or more characteristically, the hopping interval in the time domain may be configured by higher layer signaling (e.g., PBCH, RMSI, and RRC) and/or in the DCI in consideration of multiplexing between the PDSCH or the PUSCH different in the number of configuration symbols.

The offset may be a value signaled/configured by higher layer signaling in a cell specific manner, an offset value set for each bandwidth part, or configured by setting a hopping region by a parameter (e.g., set by 1/N, 2/N, ... (N−1)/N multiple of the hopping region).

And/or a plurality of the offsets may be configured semi-statically, and a final application value may be indicated in a DCI.

Several subband sizes/offsets and hopping patterns in frequency hopping may be configured. The corresponding configuration may be configured to be different depending on a configured bandwidth part (BWP). Typically, a subband size and an offset may be configured for each hopping pattern, and the corresponding value may be set to be different for each bandwidth part.

Since an effective value of the hopping pattern may be different depending on the frequency diversity gain and multiplexing between terminals, a hopping pattern to be used may be set to be different for each bandwidth part, or one of several hopping patterns may be set dynamically. An example of such a hopping pattern is as follows.

1) Type 1: The index of RB or RBG may be increased by an offset value configured to be cell-specific. This allows terminals to use the same hopping pattern although the terminals have different bandwidth parts, thereby minimizing the occurrence of a collision due to hopping between the terminals. Or, it may be considered that the offset setting itself is performed for each bandwidth part and the network sets the same value for a plurality of bandwidth parts.

2) Type 2: Like the LTE PUCCH type 1, a hopping bandwidth configured to a terminal may be divided into a half and the RB or RBG index may be increased by the corresponding value. Since the terminals having different bandwidth parts perform hoping with different offsets, a collision may be increased but a diversity gain may be obtained. When the corresponding scheme is used, it is possible to have an offset with a specific value rather than dividing the hopping band by half.

3) Type 3: Like the LTE PUCCH type 2, hopping is applied to a hopping bandwidth larger than its own bandwidth part. If it is hopped to an RB or RBG index larger than the own bandwidth part by hopping, an absolute frequency location of the uplink bandwidth part may be moved according to the hopping. Alternatively, multi-level hopping may be performed when hopping is applied. For example, one uplink bandwidth part may be divided into several subbands, type 1 or 2 may be performed within a subband, and type 1 or type 2 may be performed again for each subband.

The hopping in the initial uplink bandwidth part in which a message 3 is transmitted may also follow the above method, and a hopping scheme may be transmitted in the random access response (RAR). When the message 3 is transmitted, in the case of applying at least inter-slot hopping is applied in consideration of a case where the initial uplink bandwidth part is small, it may be considered that the absolute frequency location of the uplink bandwidth part is changed. In other words, frequency hopping may be performed within the hopping bandwidth configured based on common PRB indexing, and the corresponding hopping bandwidth may be configured by the RSMI, or the like. The physical location of the initial uplink bandwidth part may be changed by the corresponding hopping. This may be applied only to inter-slot hopping, or only to initial transmission or retransmission of message 3.

More generally, inter-slot hopping may be performed within a cell common or group common hopping bandwidth based on common PRB indexing, and intra-slot hopping may be performed within an activated bandwidth part of a terminal.

The advantage of the above scheme is that when a case where the RBG size is small (e.g., 1 RB granularity) is supported, 1 RB granularity is performed, to allocate resource in the RIV scheme, and thereafter, only interleaving may be performed by RBG size granularity. The advantage of the above scheme is that, while resource allocation is performed smaller than the RBG size, simultaneously allocated RBs may be distributed while considering multiplexing with other PDSCH or PUSCH (i.e., maintaining the RBG grid).

In the case of a compact resource allocation, it may be considered to reduce the possible combinations of allocated resources to further reduce a corresponding bit field size. For example, a relationship between possible combinations of the allocated resources has a nested structure. For example, the starting RB may be limited.

<Resource Allocation Scheme According to Waveform>

In the future wireless communication system, different waveforms such as CP-OFDM and DFT-S-OFDM may be supported. And/or for a certain situation, only consecutive resource allocation may be allowed or non-consecutive resource allocation and/or consecutive resource allocation may be allowed, in performing resource allocation.

For example, in the case of uplink transmission, a resource allocation type or method may be configured to be different according to waveforms by supporting both CP-OFDM and DFT-S-OFDM. Selection of a waveform may follow the configuration of higher layer signaling. In this case, the DCI size and/or the resource allocation field size between different waveforms may be set to be different from each other. However, if the waveform is changed flexibly, it may be necessary to match the DCI size and/or the resource allocation field size equally.

Alternatively, the resource allocation field may be configured to be the same, regardless of waveform.

In the case of the scheme capable of supporting the non-consecutive resource allocation, the consecutive resource allocation may be displayed according to set values.

In addition, the above scheme may be extended to equalize the size and/or resource allocation field between a DCI for PDSCH scheduling and a DCI for PUSCH scheduling.

The resource allocation field size and/or the DCI size may be different for a type that supports only consecutive resource allocation and a type that may support consecutive resource allocation and non-consecutive resource allocation. In this situation, a DCI scheduling a transmission mode (TM)-independent PDSCH and a DCI scheduling a PUSCH supporting only consecutive resource allocation or having a waveform of DFT-S-OFDM may be configured to have the same size, and a DCI scheduling a TM-dependent PDSCH and a DCI scheduling a PUSCH supporting even non-consecutive resource allocation or having a waveform of CP-OFDM may be configured to have the same size.

In addition, if the terminal may detect a DCI capable of scheduling a plurality of types of PUSCH, a waveform may be changed according to the detected DCI or a resource allocation type included therein. For example, if the resource allocation in the DCI only allows only consecutive resource allocation, the waveform of the corresponding PUSCH may be DFT-S-OFDM, and otherwise, the CP-OFDM.

<Alignment Between RBG and PRG>

For the RBG, a bitmap may be used a basic unit when frequency resources are allocated. PRG is precoder granularity and it may be assumed that the same precoder is applied to the PRBs in the same PRG. Also, the PRG may be used as a basic unit for channel estimation based on that.

In NR, the PRG may be configured on the basis of a common resource block irrespective of the bandwidth part in consideration of multi-user MIMO (MU-MIMO) between terminals for which different bandwidth parts are configured. In the future wireless communication system, it is not expected that the PRG size is 4RB when the RBG size=2 RB in consideration of terminal implementation complexity. The reason is because, if the substantial PRG size is changed according to resource allocation, complexity increases when the channel estimation is performed. In addition, according to scheduling, as interpolation is limited, channel estimation performance is different between RBs to be scheduled, degrading demodulation performance.

If the boundaries between RBG and PRG are not aligned, a situation in which a single PRG overlaps a plurality of RBGs as described above may occur. Similar to the above situation, as interpolation is limited according to scheduling, the channel estimation performance may be degraded.

Therefore, both RBG and PRG may be defined/configured on the basis of a common resource block (CRB or system band). For example, an RB constituting an RBG may be configured in frequency increasing order from CRB #0. In this case, the first RBG in the bandwidth part may be set to {(indicated RBG size−bandwidth part start)mod indicated RBG size}. The indicated RBG size may be a value set according to a bandwidth part size and/or a table configured by a higher layer and/or an indicated bandwidth part and/or a bandwidth part in which a DCI is transmitted. The last RBG may be {(bandwidth part start+bandwidth part size) mode (indicated RBG size or indicated RBG size). A resultant value of the above equation may be 0. The remaining RBG may be the indicated RBG size.

Or, the starting CRB index for the bandwidth part may be limited. More specifically, the starting CRB index for the bandwidth part may be configured to a multiple of a specific PRG size (e.g., 2 or 4). That is, the starting CRB index of the bandwidth part may be expected to be configured such that RBG and PRG are aligned on the boundary side.

The number of RBGs may be determined according to the bandwidth part start RB, the bandwidth part size and the indicated RBG size. If the bandwidth part start RB can be divided by the indicated RBG size, the number of RBGs in the bandwidth part may be set to roundup of {bandwidth part size/indicated RBG}. If the bandwidth part starting RB cannot be divided by the indicated RBG size, the number of RBGs may be roundup of {bandwidth part size/indicated RBG}+1.

In another example, the number ($N_{RBG}$) of RBGs in a bandwidth part may be expressed by Ceiling (bandwidth part size/indicated RBG size)+Ceiling ((bandwidth part start index mod indicated RBG size/indicated RBG size)) and may be Ceiling ((bandwidth part size+bandwidth part start index mod indicated RBG size)/indicated RBG size). A bit field size of the frequency domain resource allocation type 0 may be determined based on the number of RBGs. In this case, a reference bandwidth part may be a largest one of the configured bandwidth parts, a bandwidth part where the DCI is transmitted, or a bandwidth part where the scheduled PDSCH or PUSCH is transmitted.

Figure 11:
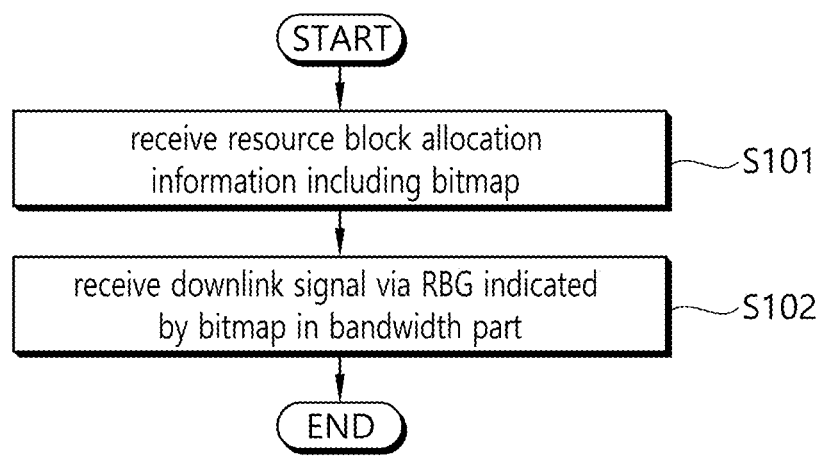
FIG. 11 illustrates a terminal operation related to downlink resource allocation.

FIG. 11 illustrates a terminal operation related to downlink resource allocation.

Referring to FIG. 11, a terminal receives resource block allocation (assignment) information including a bitmap (S 101), and in a bandwidth part (BWP), a downlink signal, e.g., a PDSCH, may be received (or a PUSCH is transmitted) through a resource block group indicated by the bitmap (S 102).

In this case, the total number of resource block groups in the bandwidth part may be determined based on the index of the starting resource block of the bandwidth part, the size of the bandwidth part, and the size of one resource block group.

For example, when the bandwidth part is i-th (i is a 0 or a natural number) bandwidth part and includes $N^{size}_{BWP,i}$ number of PRBs, the total number of resource block groups may be determined by the following equation.

$$N_{RBG}=\lceil (N^{size}_{BWP,i}+(N^{start}_{BWP,i} \bmod P))/P \rceil \quad \text{[Equation 1]}$$

In the above equation, $N^{start}_{BWP,i}$ may be an index of a starting resource block of the i-th bandwidth part, $N^{size}_{BWP,i}$ may be a size of the i-th bandwidth part, and P may be a size of one configured resource block group. The P may be selected/determined according to a size of the bandwidth part among candidate values previously set through a radio resource control (RRC) message. The candidate values may be provided in the form of a table through an RRC message.

Also, the number of bits of the bitmap may be equal to the total number of resource block groups ($N_{RBG}$), and each bit of the bitmap corresponds to each resource block group of the bandwidth part in a one-to-one manner to indicate whether or not each resource block group is allocated.

More specifically, each step of FIG. 11 will be described below. In downlink resource allocation type 0 in NR, resource block allocation (assignment) information includes a bitmap indicating RBGs allocated to a UE. The RBG, as a set of consecutive (virtual) resource blocks, may be defined by the size of the bandwidth part and the parameters configured by higher layer signaling.

The following table illustrates the RBG size P according to bandwidth part size.

TABLE 6

| Bandwidth part size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Figure 12:
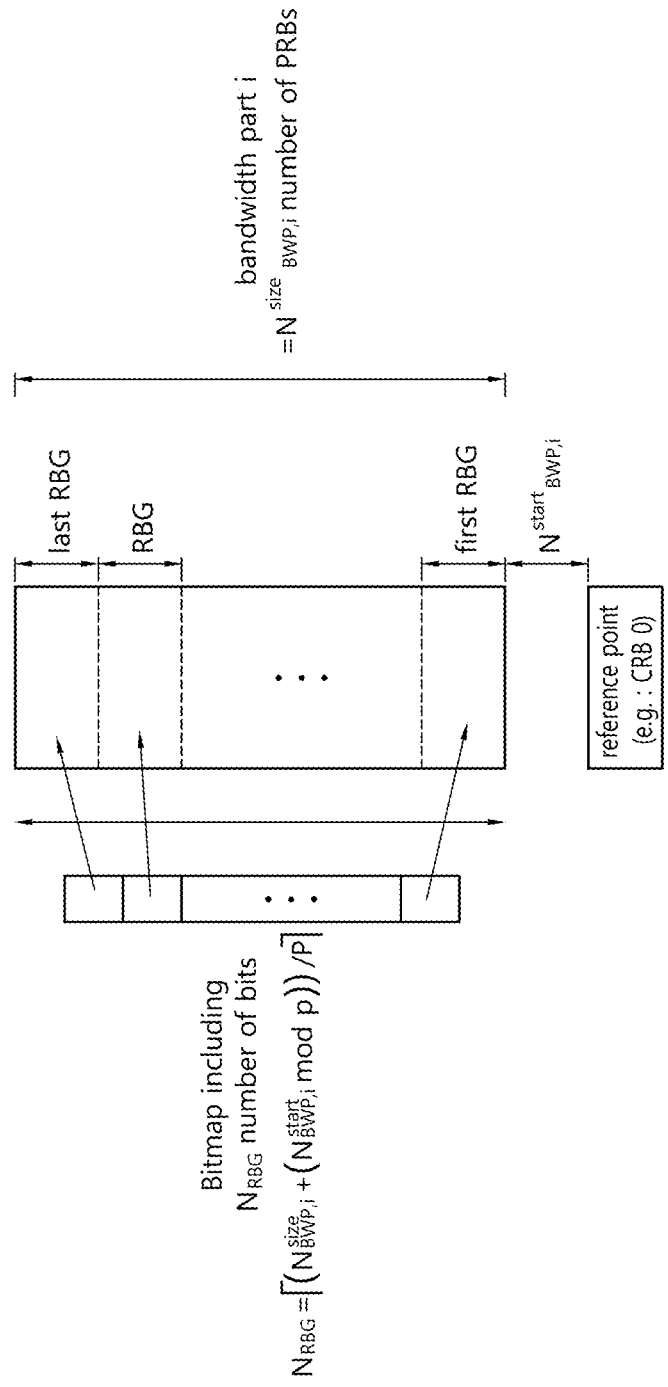
FIG. 12 illustrates an example of determining the number ($N_{RBG}$) of RBGs for a downlink carrier bandwidth part i including $N^{size}_{BWP,i}$ number of PRBs.

FIG. 12 illustrates an example of determining the number ($N_{RBG}$) of RBGs for a downlink carrier bandwidth part i including $N^{size}_{BWP,i}$ number of PRBs.

As described above, in the present disclosure, the number of RBGs ($N_{RBG}$) may be determined as Ceiling (($N^{size}_{BWP,i}+(N^{start}_{BWP,i} \bmod P))/P$).

More specifically, $N^{start}_{BWP,i}$ may indicate a starting position of the i-th BWP (e.g., a starting resource block index) based on a reference point (e.g., CRB 0), and $N^{size}_{BWP,i}$ may indicate a size of the i-th BWP (i.e., the number of resource blocks constituting the i-th BWP, in other words, a size of the i-th BWP). And P is a size of the indicate RBG. The size of a bitmap of resource allocation type 0 (frequency domain) may be determined based on the number of RBGs ($N_{RBG}$). The remaining RBGs except for a first RBG and a last RBG may all have the same size P. The first RBG and the last RBG may have sizes other than P, depending on the value of $N^{size}_{BWP,i}$. For example, the size of the first RBG may be $P-N^{start}_{BWP,i} \bmod P$, and the size of the last RBG may be $(N^{start}_{BWP,i}+N^{size}_{BWP,i}) \bmod P$ if $(N^{start}_{BWP,i}+N^{size}_{BWP,i}) \bmod P$ is greater than 0.

Meanwhile, in the case of the resource allocation type 1, when interleaved VRB-to-PRB is mapped, interleaving may be performed in units of RB bundles, and the corresponding RB bundles need to be similarly set/defined based on the CRB. RB bundles may be defined as consecutive resource blocks. That is, after interleaving, boundaries of the RB bundles may be aligned with the PRG, thereby lowering complexity of channel estimation and enhancing performance.

Figure 13:
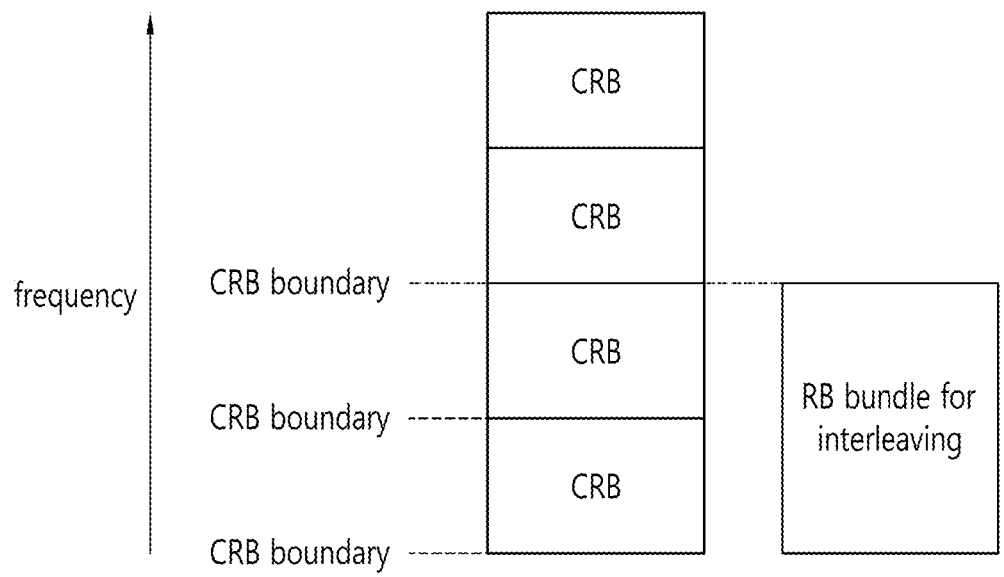
FIG. 13 illustrates an example of aligning the boundaries between RB bundles for interleaving and the CRB in resource allocation type 1.

FIG. 13 illustrates an example of aligning the boundaries between RB bundles for interleaving and the CRB in resource allocation type 1.

Referring to FIG. 13, the boundaries between the RB bundles for interleaving and the CRB are configured/defined to be aligned. The CRB may be the same as the PRB. After interleaving, boundaries of the RB bundles may be aligned with the PRG which is a group of PRBs.

The UE may assume that the same precoding is used in the frequency domain within the RRB bundle. The UE does not assume that the same precoding is used in bundles of different CRBs.

Meanwhile, since the information on the common resource block (CRB) grid is given by the RMSI, whether to or how to perform interleaved VRB-to-PRB mapping on the PDSCH (hereinafter, RMS-PDSCH) including the RMSI scheduled by a DCI format 1_0 In the common search space of CORSET 0 needs to be defined.

Specifically, in the common resource block grid, $N^{start}_{BWP,i}$ and $N^{size}_{BWP,i}$ may be defined. The UE may not know the above values until it receives the RMSI. For simplification, the RMSI-PDSCH may consider to support only non-interleaved VRB-to-PRB mapping. In this case, reception performance of the RMSI may be degraded due to shortage of frequency diversity.

Alternatively, a resource block bundle for the RMSI-PDSCH may be defined in an initial downlink bandwidth part grid. Specifically, the resource block bundle starts from a first resource block index of the initial downlink bandwidth part, and all the resource block bundles may be composed of, for example, two consecutive resource blocks.

Proposal 1: Interleaved VRB-to-PRB mapping may be used for PDSCH including RMSI in the initial downlink bandwidth part. The resource block bundle may be defined in the initial downlink bandwidth part, without considering the common resource block grid.

After receiving the RMSI, the common resource block grid is informed to the UE. Then, all the techniques based on the common resource block grid are available to be used. In this case, if the PDSCH including the RMSI is received in a downlink bandwidth part other than the initial downlink bandwidth part, the resource block bundles for the interleaved VRB-to-PRB mapping may be defined to be aligned to the common resource block grid.

The UE may receive another PDSCH (i.e., PDSCH not including RMSI) in the initial downlink bandwidth part. In this case, when multiplexing of a plurality of terminals is considered, it is preferred to make the definitions of the resource block bundles the same, regardless of RNTI applied to the PDSCH. In other words, regardless of the RNTI, it may be assumed that all PDSCH mappings in the initial downlink bandwidth part are defined in the initial downlink bandwidth part, without considering the common resource block grid.

Also, in the initial downlink bandwidth part, the RBG may be defined without considering the common resource block grid.

Proposal 2: For PDSCH including OSI, paging, random access response (RAR) in the initial downlink bandwidth part, etc., the resource block bundle may be defined in the initial downlink bandwidth part, without considering the common resource block grid.

That is, when the interleaved VRB-to-PRB is mapped, a boundary of an interleaver bundle may be defined/configured based on an (initial) bandwidth part instead of the CRB in the following exceptional situations. The exceptional situations may be a case where the DCI schedules the RMSI, a case where the DCI belongs to the CORESET #0 associated with the common search space (CSS), while the DCI is scheduling the RMSI, a case where the DCI belongs to the CSS, a case where the DCI belongs to the CSS of the initial downlink bandwidth part, and a case where the DCI belongs to the initial downlink bandwidth part. More specifically, the RBG in the resource allocation of the bitmap scheme may also be configured to be aligned in the boundary based on the bandwidth part instead of the CRB exceptionally.

Alternatively, whether the DCI scrambled by the SI-RNTI constitutes a resource block bundle for interleaved VRB-to-PRB mapping may be indicated.

In particular, since the size of the resource block bundle is set to 2 before the RRC configuration, the DCI may indicate whether the size of the first resource block bundle is 1 or 2 according to the starting RB index of the initial downlink bandwidth part (using one of the reserved bits). In this case, the resource block bundle may be aligned to the common resource block grid also in the RMSI-PDSCH.

The DCI scrambled to the SI-RNTI may indicate ($N^{start}_{BWP,i}$ mod 2), i.e., a method of configuring the resource block bundle in the DCI scheduling the PDSCH, a size of a first resource block bundle, an offset value between the PRB where the resource block bundle starts and the common resource block grid.

<Misalignment Between RA Bandwidth and Actual BWP Size)>

In the future wireless communication system, the number of DCI sizes to be monitored by the UE may be limited for the purpose of lowering complexity of the UE. More specifically, a resource allocation bit field of the DCI format 1_0 and the DCI format 0_0 (hereinafter, referred to as "fallback DCI") may be configured based on an activated bandwidth part in which the corresponding fallback DCI is transmitted (in case where the number of the DCI sizes is sufficient) or may be configured based on the initial (downlink) bandwidth part size (in case where the number of DCI sizes exceeds a predetermined level or is to exceed the predetermined level), when the DCI format 1_0 and the DCI format 0_0 are transmitted in a specific search space (e.g., a UE-specific search space).

According to the above situation, it may be considered that frequency ranges that may be indicated by the resource allocation bit field are configured to be different. Basically, when the bit size of the resource allocation field and the size of the resource allocation field required in the bandwidth part to which the DCI belongs are equal (or when the bit size of the resource allocation field is configured to be larger), a lowest resource block (RB) index corresponding to the resource allocation field is matched to the smallest RB index of the corresponding bandwidth part, and the highest RB index may be matched to the largest RB index of the corresponding bandwidth part. The above-mentioned area may be applied to an interleaving target area equally.

Meanwhile, when the bit size of the resource allocation field is smaller than the resource allocation field size required in the bandwidth part, the lowest RB index corresponding to the resource allocation field is matched to the smallest RB index of the corresponding bandwidth part and the highest RB index may be matched to the RB index away from the smallest RB index of the corresponding bandwidth part by the initial (downlink) bandwidth part. This is to perform resource allocation more efficiently due to a limitation of the bit size of the resource allocation field. Here, the interleaving target area may also be set based on an area set to be smaller than the actual bandwidth part equally. Alternatively, as a method for utilizing the advantages of the relatively large activated bandwidth part, it may be considered that the interleaving target area is still configured as the activated bandwidth part.

If the region corresponding to the resource allocation field is configured as the activated bandwidth part even when the bit size of the resource allocation field is smaller than the resource allocation field size required by the bandwidth part, zero-padding may be performed on the LSB or the MSB before interpreting the corresponding bit field.

Figure 14:
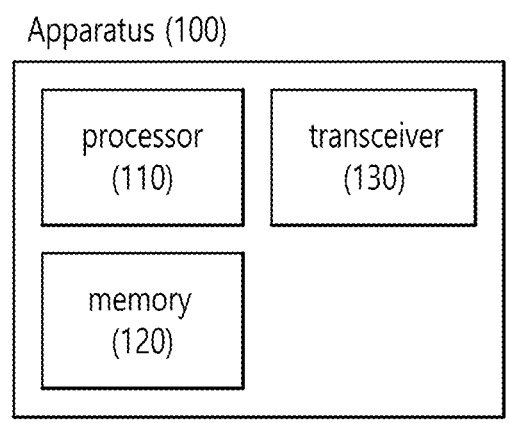
FIG. 14 is a block diagram illustrating a device implementing an embodiment of the present disclosure.

FIG. 14 is a block diagram illustrating a device implementing an embodiment of the present disclosure.

Referring to FIG. 14, the device 100 includes a processor 110, a memory 120, and a transceiver 130. The processor 110 implements the proposed functions, processes and/or methods. The memory 120 is connected to the processor 110 and stores various types of information for driving the processor 110. The transceiver 130 is connected to the processor 110 and transmits and/or receives a wireless signal.

The device 100 may be a base station (BS) or a terminal (or a user equipment (UE)).

The processor 110 may include application-specific integrated circuits (ASICs), other chipsets, logic circuits, data processors and/or a converter mutually converting a baseband signal and a wireless signal. The memory 120 may include read-only memory (ROM), random access memory (RAM), a flash memory, memory cards, storage mediums and/or other storage devices. The transceiver 130 may include at least one antenna for transmitting and/or receiving a wireless signal. When an embodiment is implemented by software, the above-described scheme may be implemented using a module (process or function) which performs the above function. The module may be stored in the memory 120 and executed by the processor 110. The memory 120 may be disposed within or outside the processor 110 and connected to the processor using a variety of well-known means.

What is claimed is:

1. A method of receiving, by a user equipment (UE), a downlink signal in a wireless communication system, the method comprising:
   receiving resource block (RB) assignment information comprising a bitmap; and
   receiving, in a bandwidth part (BWP), the downlink signal through at least one resource block group (RBG) informed by the bitmap,
   wherein based on the BWP being an i-th BWP among BWPs within a carrier bandwidth, a total number of RBGs for the BWP is determined based on:

$$N_{RBG} = \lceil (N_{BWP,i}^{size} + (N_{BWP,i}^{start} \bmod P))/P \rceil$$

where $N_{BWP,i}^{size}$ denotes a size of the i-th BWP, $N_{BWP,i}^{start}$ denotes an index of a starting RB of the i-th BWP relative to an initial RB of the carrier bandwidth, and P denotes a size of one RBG, and
   wherein each bit of the bitmap is related to a respective RBG among the determined RBGs for the BWP and indicates whether the respective RBG is allocated to the UE.

2. The method of claim 1, wherein a number of bits of the bitmap is equal to the total number ($N_{RBG}$) of RBGs for the BWP.

3. The method of claim 1, wherein the size of one RBG is determined according to the size of the BWP from among candidate values previously configured through a radio resource control (RRC) message.

4. The method of claim 1, wherein the index of the starting RB of the BWP is configured based on an initial common resource block (CRB) index among CRB indices that are indexed from a lowest frequency of the carrier bandwidth.

5. A user equipment (UE) configured to receive a downlink signal in a wireless communication system, the UE comprising:
   a transceiver; and
   at least one processor,
   at least one computer-readable storage medium connected to the at least one processor and storing instructions that, based on being executed by the at least one processor, control the UE to:
   receive, through the transceiver, resource block (RB) assignment information comprising bitmap, and
   receive, in a bandwidth part (BWP), the downlink signal through at least one resource block group (RBG) informed by the bitmap,
   wherein based on the BWP being an i-th BWP among BWPs within a carrier bandwidth, a total number of RBGs for the BWP is determined based on:

$$N_{RBG} = \lceil (N_{BWP,i}^{size} + (N_{BWP,i}^{start} \bmod P))/P \rceil$$

where $N_{BWP,i}^{size}$ denotes a size of the i-th BWP, $N_{BWP,i}^{start}$ denotes an index of a starting RB of the i-th BWP relative to an initial RB of the carrier bandwidth, and P denotes a size of one RBG, and
   wherein each bit of the bitmap is related to a respective RBG among the determined RBGs for the BWP and indicates whether the respective RBG is allocated to the UE.

6. The UE of claim 5, wherein a number of bits of the bitmap is equal to the total number ($N_{RBG}$) of RBGs for the BWP.

7. The UE of claim 5, wherein the size of one RBG is determined according to the size of the BWP from among candidate values previously configured through a radio resource control (RRC) message.

8. The UE of claim 5, wherein the index of the starting RB of the BWP is configured based on an initial common resource block (CRB) index among CRB indices that are indexed from a lowest frequency of the carrier bandwidth.

9. At least one computer-readable storage medium connected to at least one processor and storing instructions that, based on being executed by the at least one processor, control a user equipment (UE) operating in a wireless communication system to:
   receive resource block (RB) assignment information comprising bitmap, and
   receive, in a bandwidth part (BWP), a downlink signal through at least one resource block group (RBG) informed by the bitmap,
   wherein based on the BWP being an i-th BWP among BWPs within a carrier bandwidth, a total number of RBGs for the BWP is determined based on:

$$N_{RBG} = \lceil (N_{BWP,i}^{size} + (N_{BWP,i}^{start} \bmod P))/P \rceil$$

where $N_{BWP,i}^{size}$ denotes a size of the i-th BWP, $N_{BWP,i}^{start}$ denotes an index of a starting RB of the i-th BWP relative to an initial RB of the carrier bandwidth, and P denotes a size of one RBG, and
   wherein each bit of the bitmap is related to a respective RBG among the determined RBGs for the BWP and indicates whether the respective RBG is allocated to the UE.

10. The at least one computer-readable storage medium of claim 9, wherein a number of bits of the bitmap is equal to the total number ($N_{RBG}$) of RBGs for the BWP.

11. The at least one computer-readable storage medium of claim 9, wherein the size of one RBG is determined according to the size of the BWP from among candidate values previously configured through a radio resource control (RRC) message.

12. The at least one computer-readable storage medium of claim 9, wherein the index of the starting RB of the BWP is configured based on an initial common resource block (CRB) index among CRB indices that are indexed from a lowest frequency of the carrier bandwidth.

* * * * *